(12) United States Patent
Buechler et al.

(10) Patent No.: US 8,573,109 B2
(45) Date of Patent: Nov. 5, 2013

(54) AMMUNITION CANISTER AND FEED SYSTEM

(75) Inventors: James Buechler, Jasper, IN (US); Michael Holzmeyer, Bloomfield, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/152,921

(22) Filed: Jun. 3, 2011

(65) Prior Publication Data

US 2012/0137863 A1 Jun. 7, 2012

Related U.S. Application Data

(62) Division of application No. 12/571,396, filed on Sep. 30, 2009, now Pat. No. 8,151,684.

(60) Provisional application No. 61/179,615, filed on May 19, 2009.

(51) Int. Cl.
*F41A 9/61* (2006.01)

(52) U.S. Cl.
USPC .............................. 89/33.2; 89/33.1; 89/33.14

(58) Field of Classification Search
USPC ................ 89/33.2, 33.1, 33.14, 37.16, 37.22
See application file for complete search history.

(56) References Cited

U.S. PATENT DOCUMENTS

| | | | |
|---|---|---|---|
| 167,006 A | 8/1875 | Metcalfe | |
| 273,249 A | 3/1883 | Bruce | |
| 1,172,542 A | 2/1916 | McMullen | |
| 2,415,153 A | 2/1947 | Trimbach et al. | |
| 2,421,052 A | 5/1947 | Cantley | |
| 2,568,229 A | 9/1951 | Gardes | |
| 2,767,617 A | 10/1956 | Taylor | |
| 3,687,004 A | 8/1972 | Faisandier | |
| 4,092,900 A | 6/1978 | Hottinger et al. | |
| 4,256,012 A | 3/1981 | Cowart et al. | |
| 4,524,670 A | 6/1985 | Billard et al. | |
| 4,601,445 A | 7/1986 | Duclos et al. | |
| 4,638,715 A | 1/1987 | LeBlanc | |
| 4,682,529 A | 7/1987 | Duclos et al. | |
| 5,206,454 A * | 4/1993 | Sanderson | 89/33.14 |
| 5,263,397 A | 11/1993 | Sanderson | |
| 5,282,410 A | 2/1994 | Sanderson | |
| 5,381,721 A | 1/1995 | Holmstrom et al. | |
| 5,400,690 A | 3/1995 | Meili et al. | |
| 5,419,234 A | 5/1995 | Sanderson | |
| 5,554,815 A * | 9/1996 | Authie et al. | 89/1.59 |
| 5,767,436 A * | 6/1998 | Sanderson et al. | 89/37.22 |
| 6,250,197 B1 | 6/2001 | Sanderson | |
| 6,286,411 B1 | 9/2001 | Sanderson | |
| 6,293,179 B1 | 9/2001 | Sanderson | |
| 6,393,960 B1 * | 5/2002 | Bilger | 89/37.03 |
| 6,564,690 B1 * | 5/2003 | Long | 89/37.16 |
| 6,622,606 B1 | 9/2003 | Neal | |
| 6,675,694 B1 | 1/2004 | Liebig | |
| 6,718,862 B1 | 4/2004 | Sanderson | |
| 6,779,430 B1 | 8/2004 | Sanderson | |

(Continued)

*Primary Examiner* — Michelle Clement
(74) *Attorney, Agent, or Firm* — Christopher A. Monsey

(57) ABSTRACT

An armament system for aircraft includes an ammunition system and a mount system for a machine gun. The ammunition system includes an ammunition canister and feed system, the canister having a pair of brackets releasably coupled to a pair of receivers supported by a vertical mounting surface.

1 Claim, 25 Drawing Sheets

(56) References Cited

U.S. PATENT DOCUMENTS

| | | |
|---|---|---|
| 6,796,300 B2 | 9/2004 | Petrosyan et al. |
| 6,799,500 B1 | 10/2004 | Kulikowski |
| 6,820,532 B2 | 11/2004 | Sanderson |
| 7,069,683 B1 | 7/2006 | Kapusta |
| 7,258,055 B1 | 8/2007 | Javorsky |
| 7,513,187 B1 | 4/2009 | Lambermont |
| 7,543,524 B1 | 6/2009 | Javorsky |
| 7,624,947 B2 | 12/2009 | Dortch et al. |
| 7,694,620 B1 * | 4/2010 | Narus ............................ 89/33.1 |
| 7,765,912 B1 * | 8/2010 | Serkland ...................... 89/37.21 |
| 8,069,767 B2 * | 12/2011 | Deckard et al. ................ 89/33.4 |
| 2007/0131103 A1 | 6/2007 | McClellan et al. |
| 2010/0101401 A1 * | 4/2010 | Toeckes et al. ................ 89/1.51 |

* cited by examiner

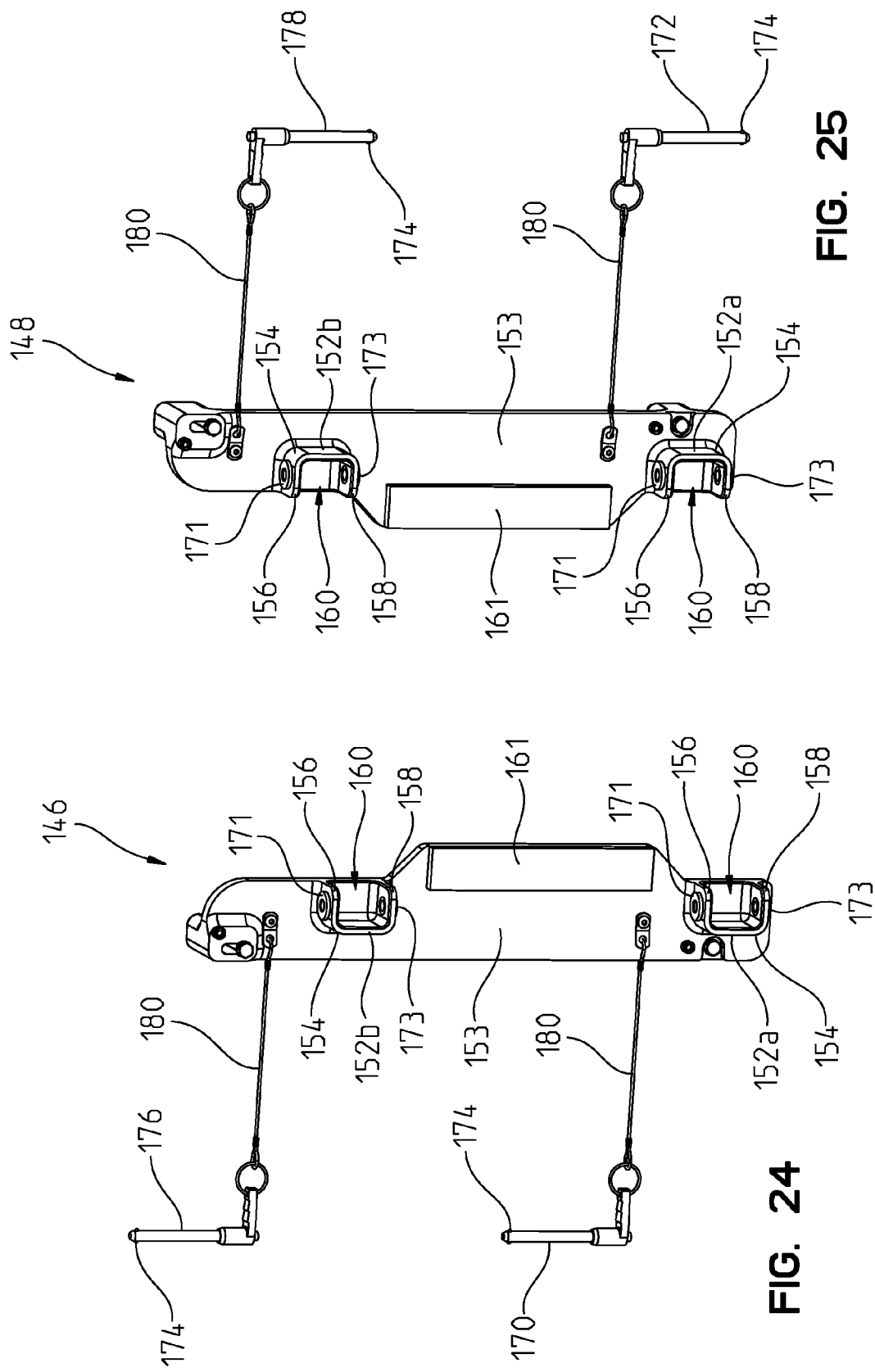

AMMUNITION CANISTER AND FEED SYSTEM

CROSS-REFERENCE TO RELATED APPLICATION

This application is a divisional of U.S. patent application Ser. No. 12/571,396, filed Sep. 30, 2009 now U.S. Pat. No. 8,151,684, titled "AMMUNITION CANISTER AND FEED SYSTEM" which claims priority to U.S. Provisional Patent Application Ser. No. 61/179,615, filed May 19, 2009, the disclosure of which are expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon.

BACKGROUND AND SUMMARY OF THE DISCLOSURE

The present disclosure relates to weapon systems and, more particularly, to helicopter armament systems.

It is known to provide weapon systems on aircraft, including helicopters. For example, 50 caliber machine guns have been mounted on helicopters using an external store support assemblies. However, there remains a need for a system to integrate updated weapons, including the GAU-21 50 caliber machine gun, onto helicopters, including the UH-1Y. Additionally, there is a need for an effective ammunition feed system, and casing and link ejection system.

According to an illustrative embodiment of the present disclosure, an ammunition feed assembly for a machine gun includes an ammunition canister including a first side wall, a second side wall extending parallel to and in spaced relation to the first side wall, a first end wall extending between the first side wall and the second side wall, and a second end wall extending between the first side wall and the second side wall in spaced relation to the first end wall, the first side wall configured to be positioned adjacent to and in substantially parallel disposition with a vertical mounting surface. A storage compartment for storing an ammunition belt in a serpentine path is defined by the first side wall, the second side wall, the first end wall, and the second end wall. A first end bracket is secured to the first end wall of the canister, and a second end bracket is secured to the second end wall of the canister. A first end receiver is configured to be secured to the vertical mounting surface and to receive the first end bracket, and a second end receiver is configured to be secured to the vertical mounting surface and to receive the second end bracket. A first pin is configured to be slidably received by the first end bracket and the first end receiver for releasably coupling the first end bracket to the first end receiver. A second pin is configured to be slidably received by the second end bracket and the second end receiver for releasably coupling the second end bracket to the second end receiver.

According to a further illustrative embodiment of the present disclosure, a method of feeding ammunition to a machine gun includes the steps of providing an ammunition belt within a storage compartment of an ammunition canister, coupling the ammunition canister to a vertical mounting surface of a helicopter, supplying the ammunition belt through a feed chute to a machine gun, and viewing through a sight formed within a wall of the ammunition canister the amount of ammunition belt remaining within the storage compartment.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 24 is a perspective view of the right hand receiver of the mounting assembly of FIG. 22;

FIG. 25 is a perspective view of the left hand receiver of the mounting assembly of FIG. 22;

Figure 1:
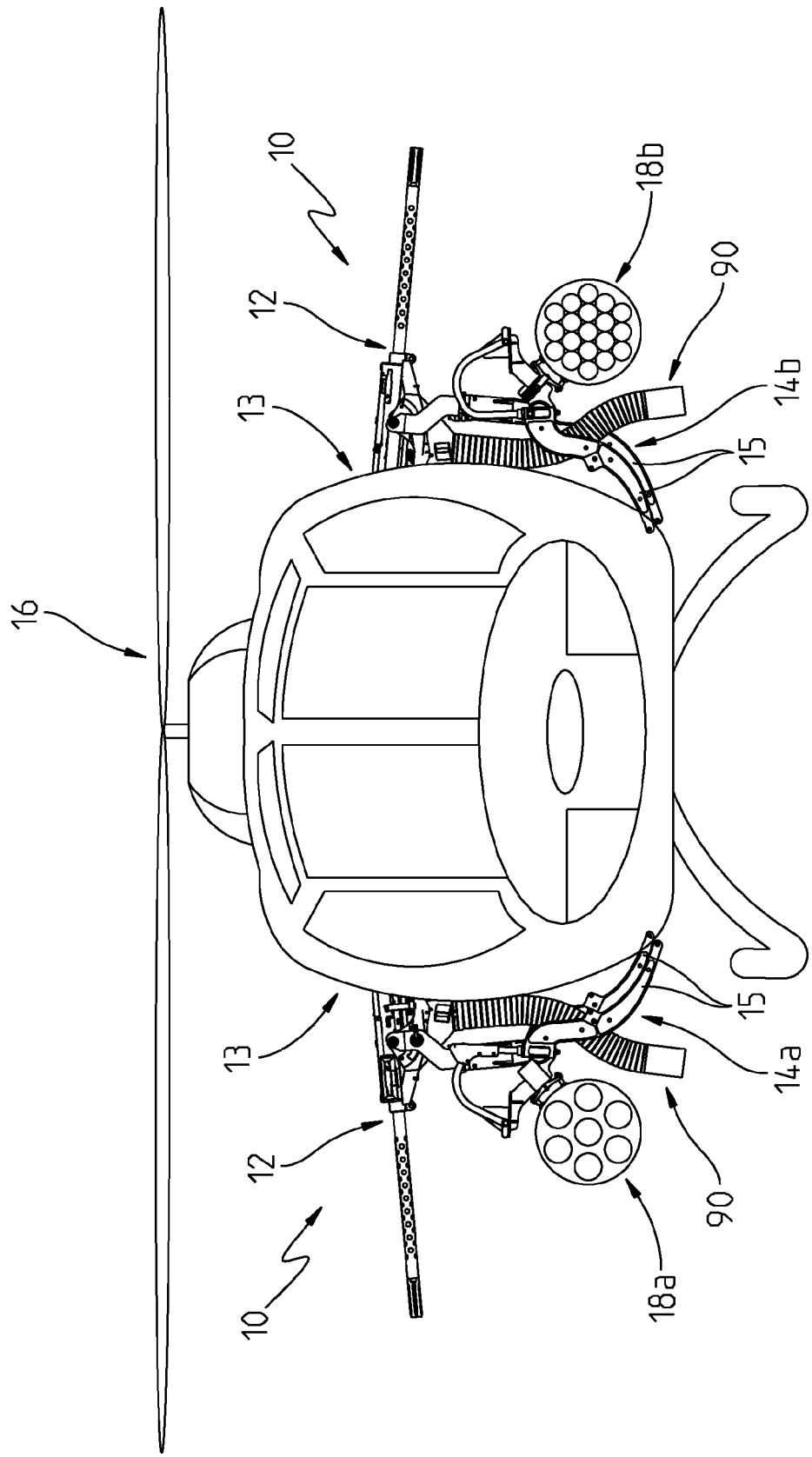
FIG. 1 is a front view in partial schematic of an illustrative helicopter including a prior art external stores support assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
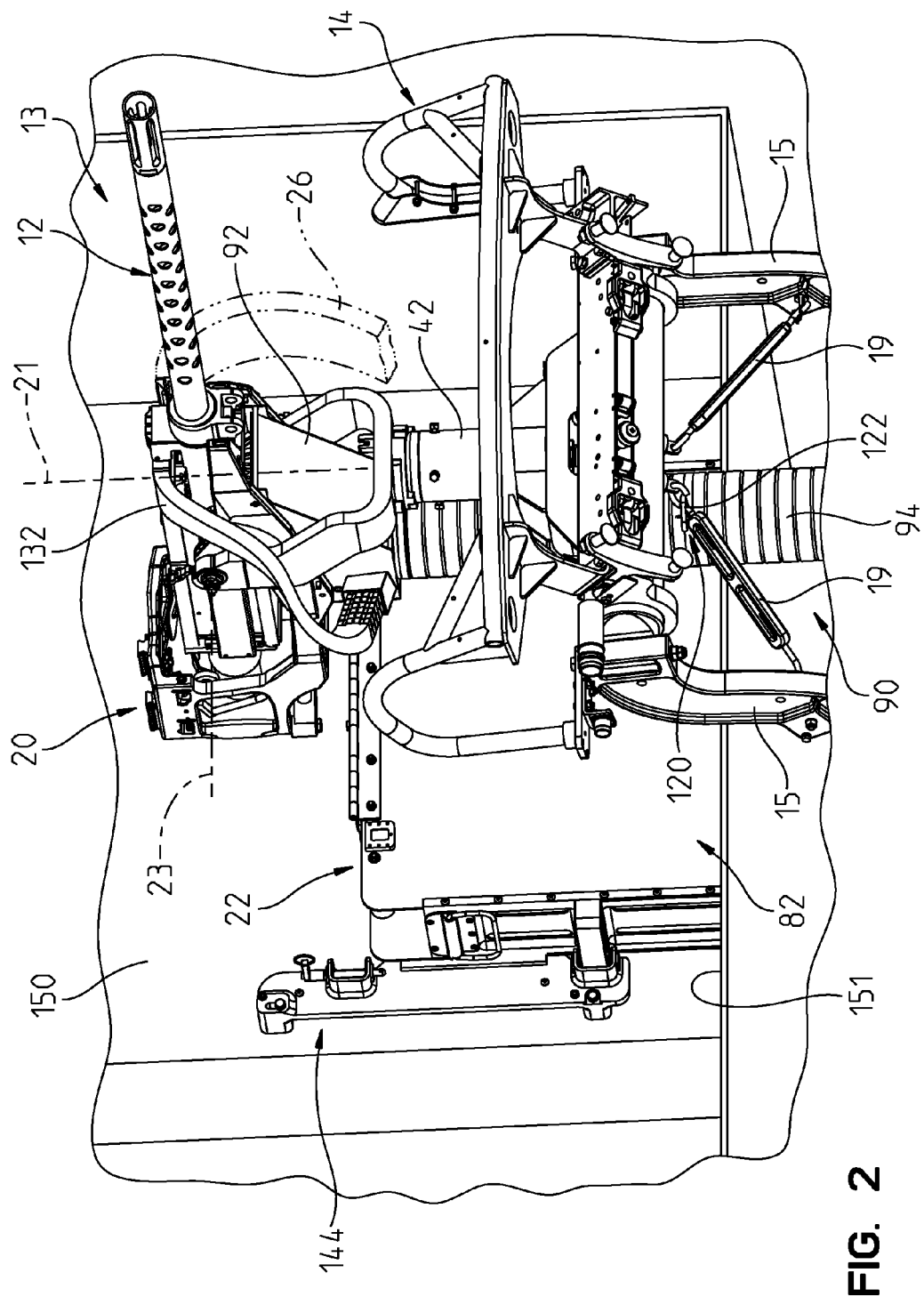
FIG. 2 is a rear side perspective view of an aircraft armament system of the present disclosure.
Figure 3:
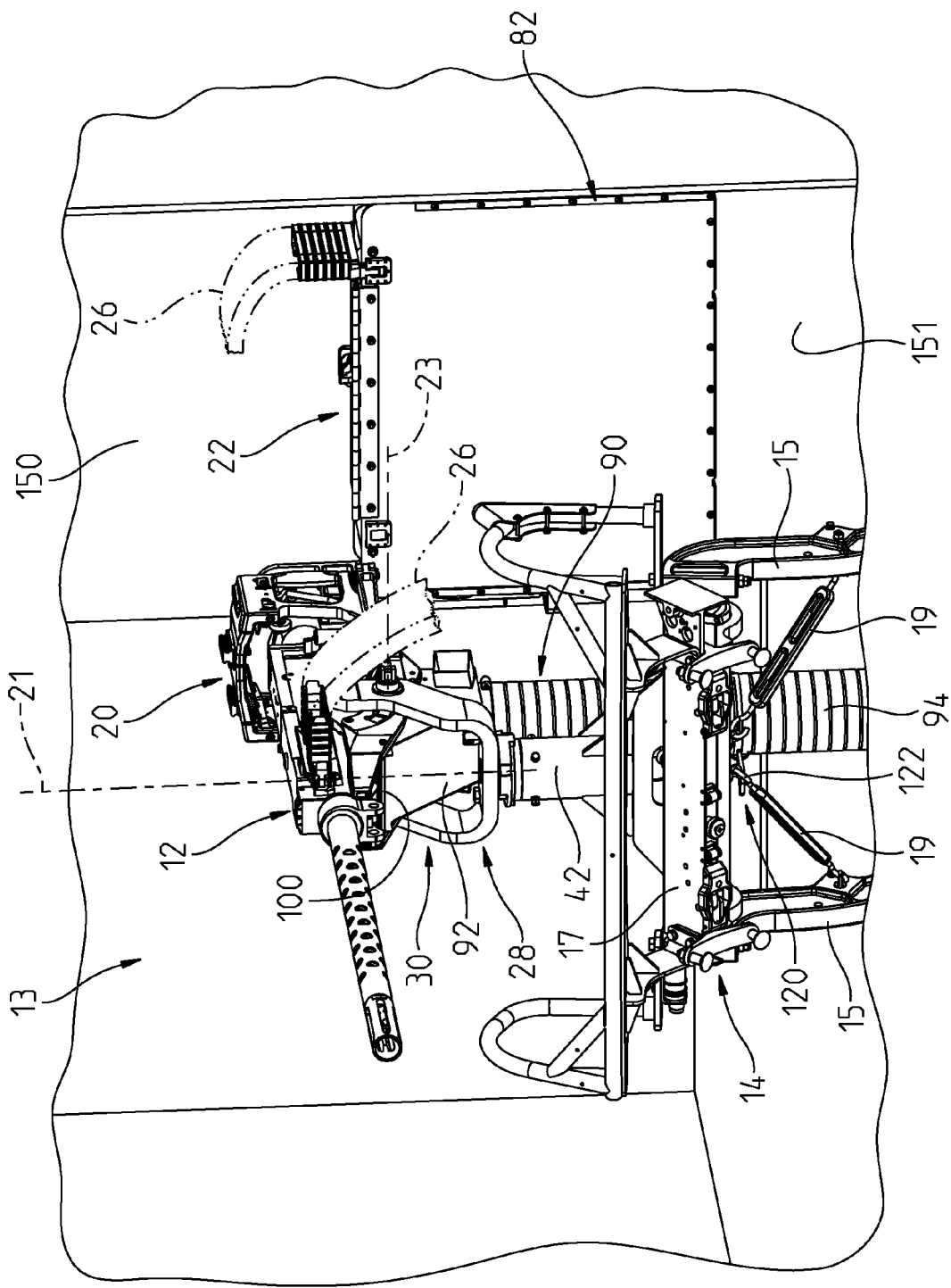
FIG. 3 is a front side perspective view of the aircraft armament system of FIG. 2.
Figure 4:
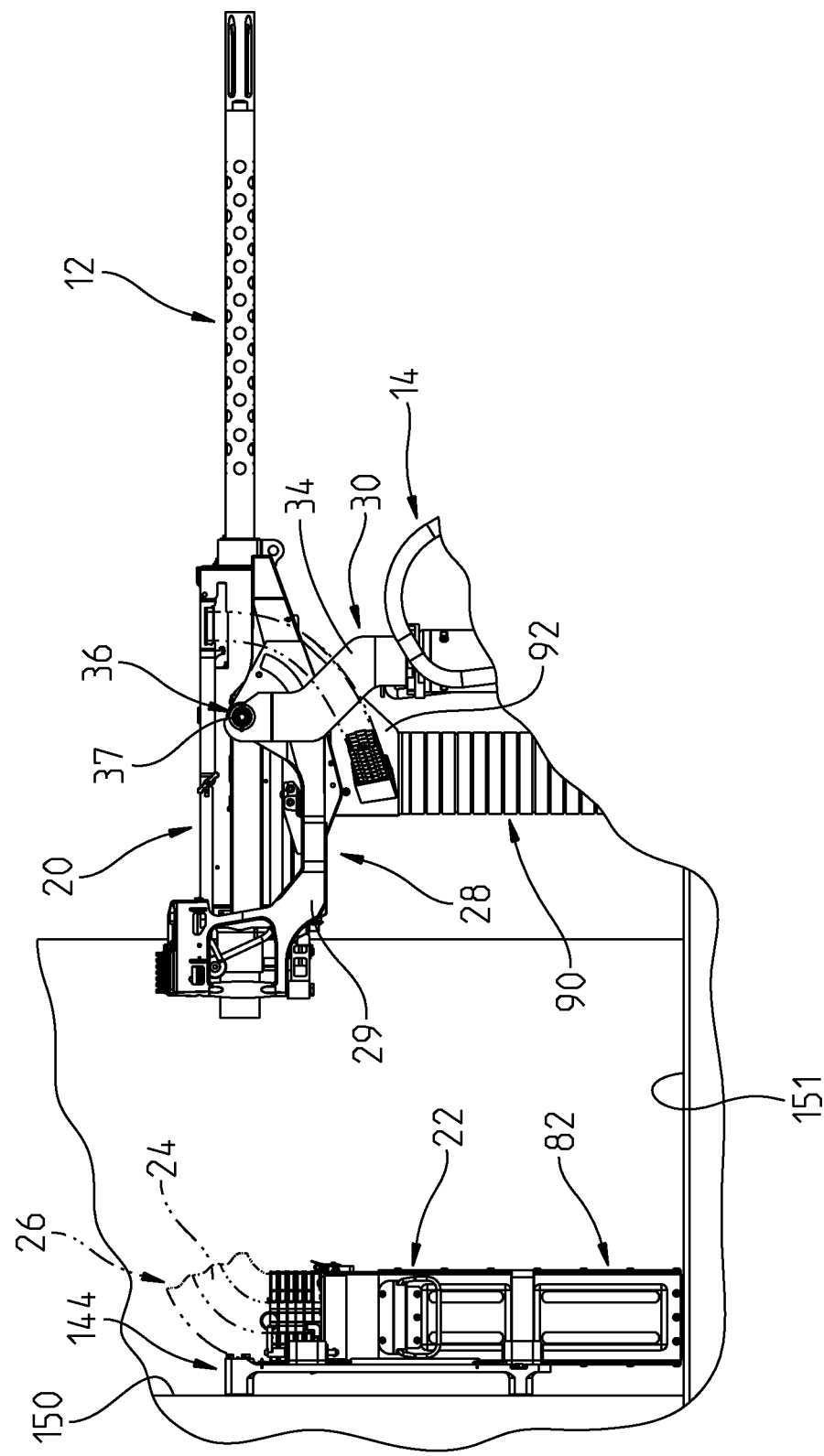
FIG. 4 is a side perspective view of the aircraft armament system of FIG. 2.
Figure 5:
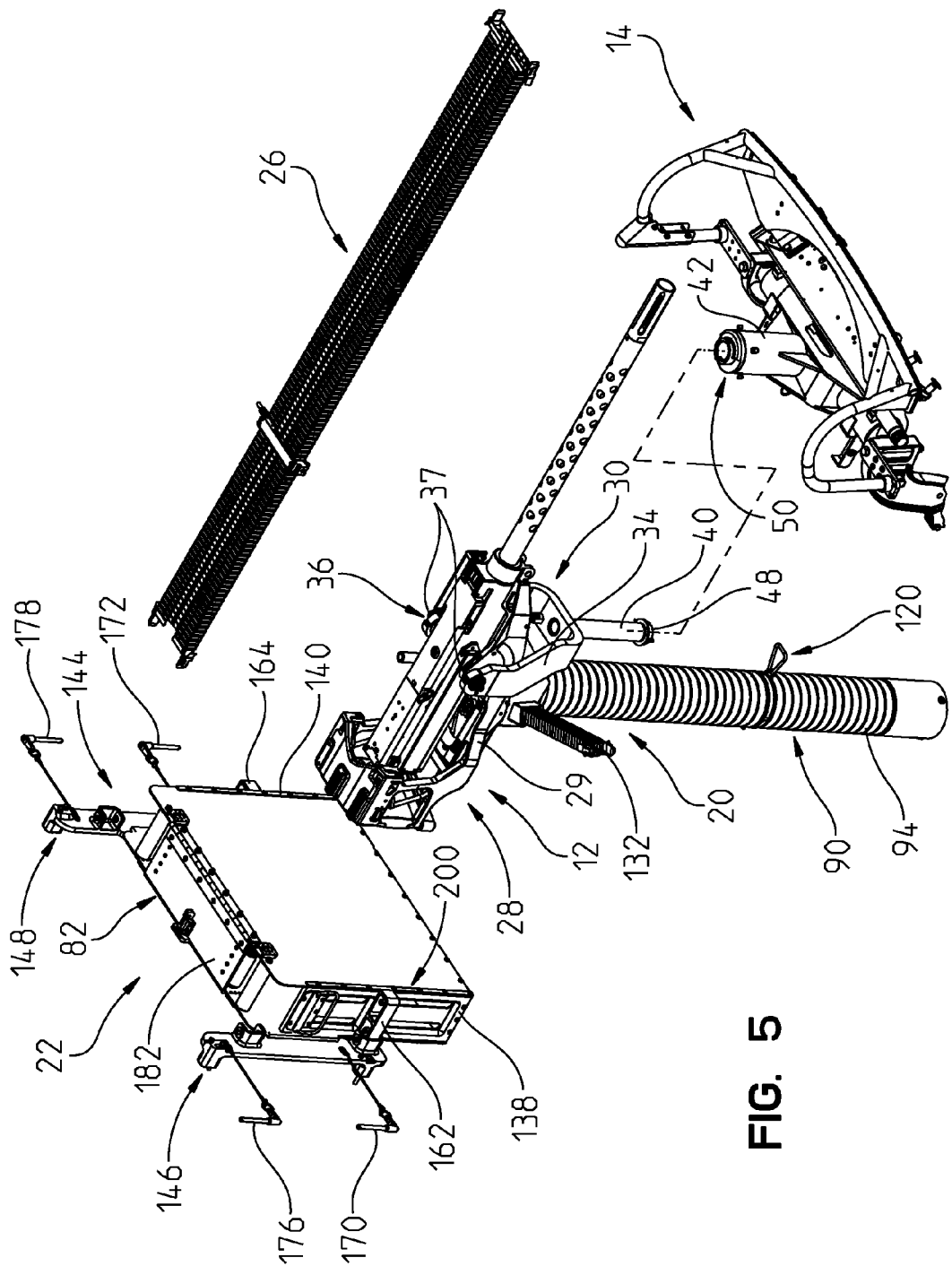
FIG. 5 is a partially exploded perspective view of an aircraft armament system of the present disclosure, showing the external stores support assembly.
Figure 6:
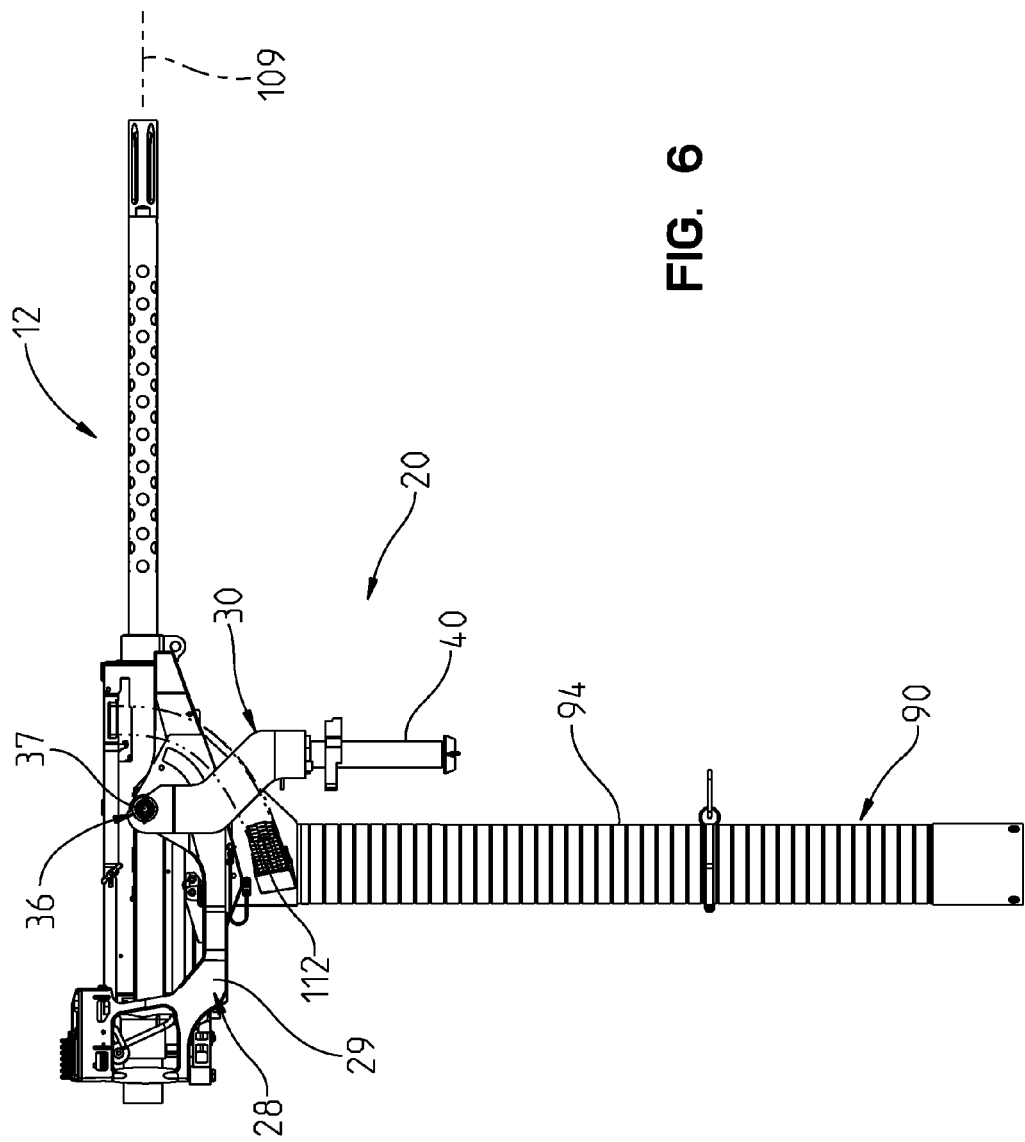
FIG. 6 is a side elevational view of the gun mount assembly of FIG. 2.
Figure 7:
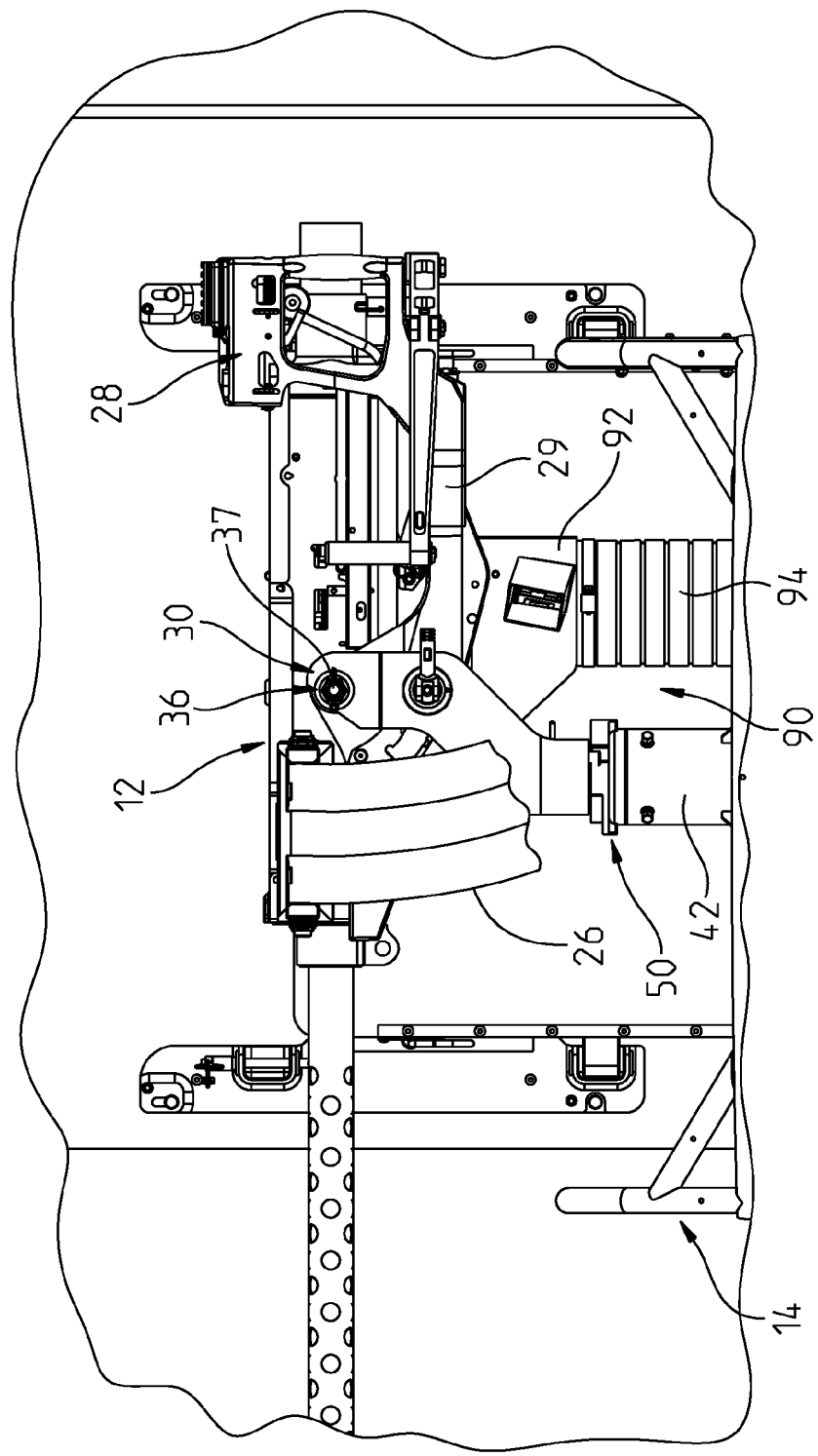
FIG. 7 is a side elevational view showing the carriage oriented in a rearward position.

Referring initially to FIGS. 1-3, a machine gun helicopter armament system 10 of the present disclosure supports a weapon 12 and is configured to be mounted to an external stores support assembly 14. The support assembly 14 may be coupled to an enclosure 13 of aircraft 16 in a known manner. Illustratively, the aircraft 16 comprises a UH-1Y helicopter including left and right support assemblies 14a and 14b mounted to the left and right sides of the helicopter 16. The enclosure 13 may be a crew compartment and illustratively includes a vertical mounting surface 150 and a horizontal floor 151. The helicopter 16 may also include additional weapons, such as rockets 18a and 18b, supported by and/or adjacent to the respective support assemblies 14a and 14b. More particularly, the support assemblies 14 may each include a pair of spaced apart downwardly extending arms 15 supporting a cross member 17 which, in turn, supports rockets 18. A pair of sway members 19, illustratively adjustable turn buckles, extend at an angle between the arms 15 and the cross member 17.

In the illustrative embodiment, the weapon 12 comprises a 50 caliber machine gun, such as a GAU-21 machine gun manufactured by FNH USA of McLean, Va. While a UH-1Y helicopter and a GAU-21 machine gun are used for illustrative purposes, it should be appreciated that other aircraft and weapons may utilize the armament system 10 of the present disclosure.

With reference to FIGS. 2 and 3, the armament system 10 illustratively includes a gun mount assembly 20 configured to support the machine gun 12 for azimuth movement (about a longitudinal (e.g. vertical) axis 21) and elevational movement (about a transverse (e.g. horizontal) axis 23). An ammunition canister and mounting assembly 22 is supported within the interior of the helicopter 16 and is configured to supply an ammunition belt 24 (FIG. 18) to the machine gun 12 through a feed chute 26. The feed chute 26 couples to the firing chamber of the machine gun 12 in a conventional manner. The feed chute 26 is illustratively formed of interconnected stainless steel segments to provide flexibility and may be manufactured by Standard Armament of Glendale, Calif.

With reference to FIGS. 4-10, the gun mount assembly 20 illustratively includes a cradle 28 operably coupled to a carriage 30. The machine gun 12 is coupled to the cradle 28 in a conventional manner. The cradle 28 includes a pair of laterally spaced apart side members 29 which are supported by the carriage 30. More particularly, the carriage 30 illustratively includes a U-shaped body or yoke 32 having laterally spaced apart uprights 34 receiving the cradle 28. The side members 29 of the cradle 28 are supported by a pivot coupling 36, illustratively defined by opposing studs 37 supported by uprights 34, for vertical pivoting movement (i.e., elevational or about axis 23) relative to the carriage 30. A base 38 connects the uprights 34 of the carriage 30 and is rotatably supported by a pintle 40. The pintle 40 extends downwardly through a hollow support shaft or mounting tube 42 of the external stores support assembly 14.

Figure 11:
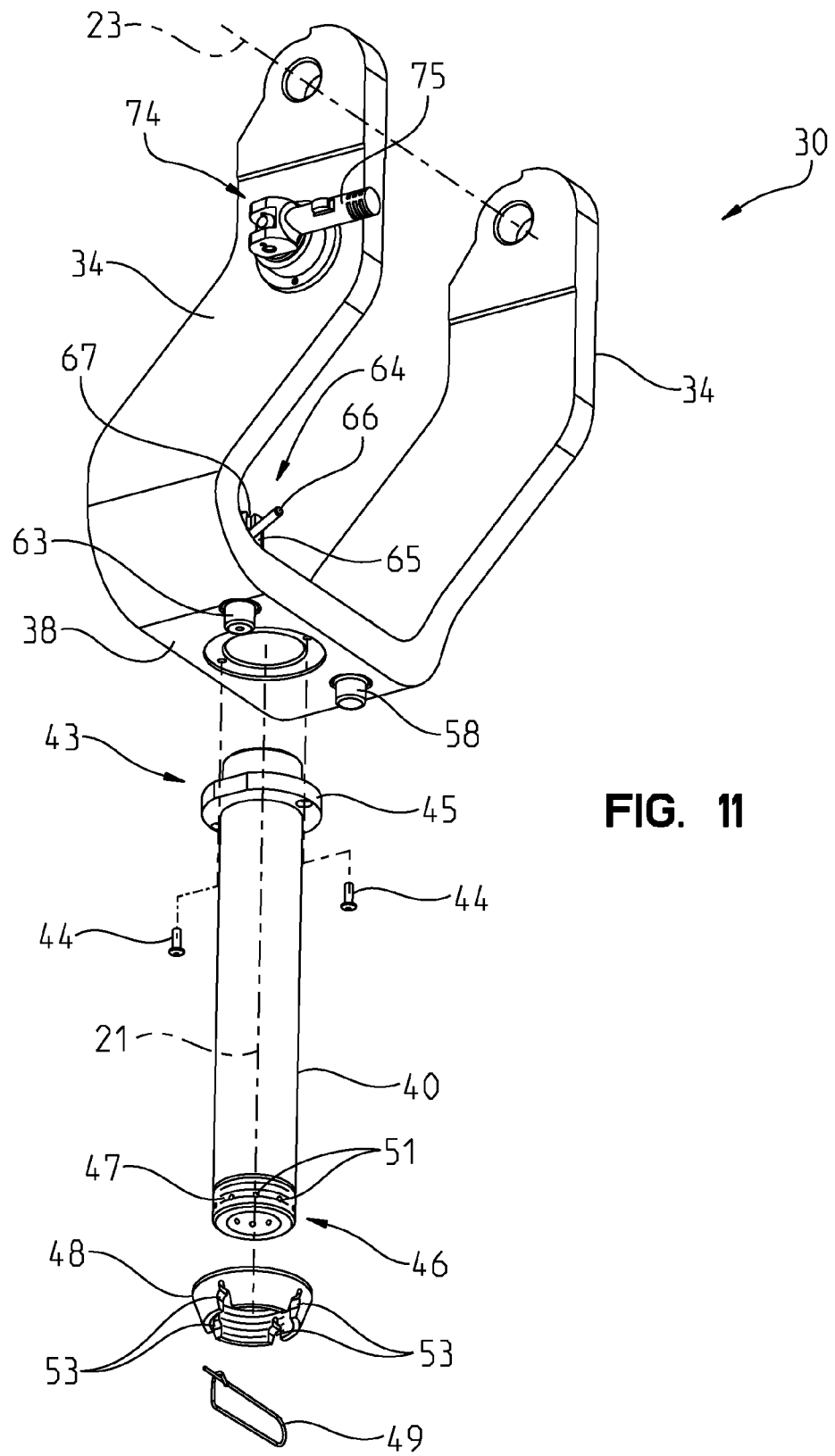
FIG. 11 is a partially exploded perspective view of the carriage of the gun mount assembly of FIG. 9.
Figure 12:
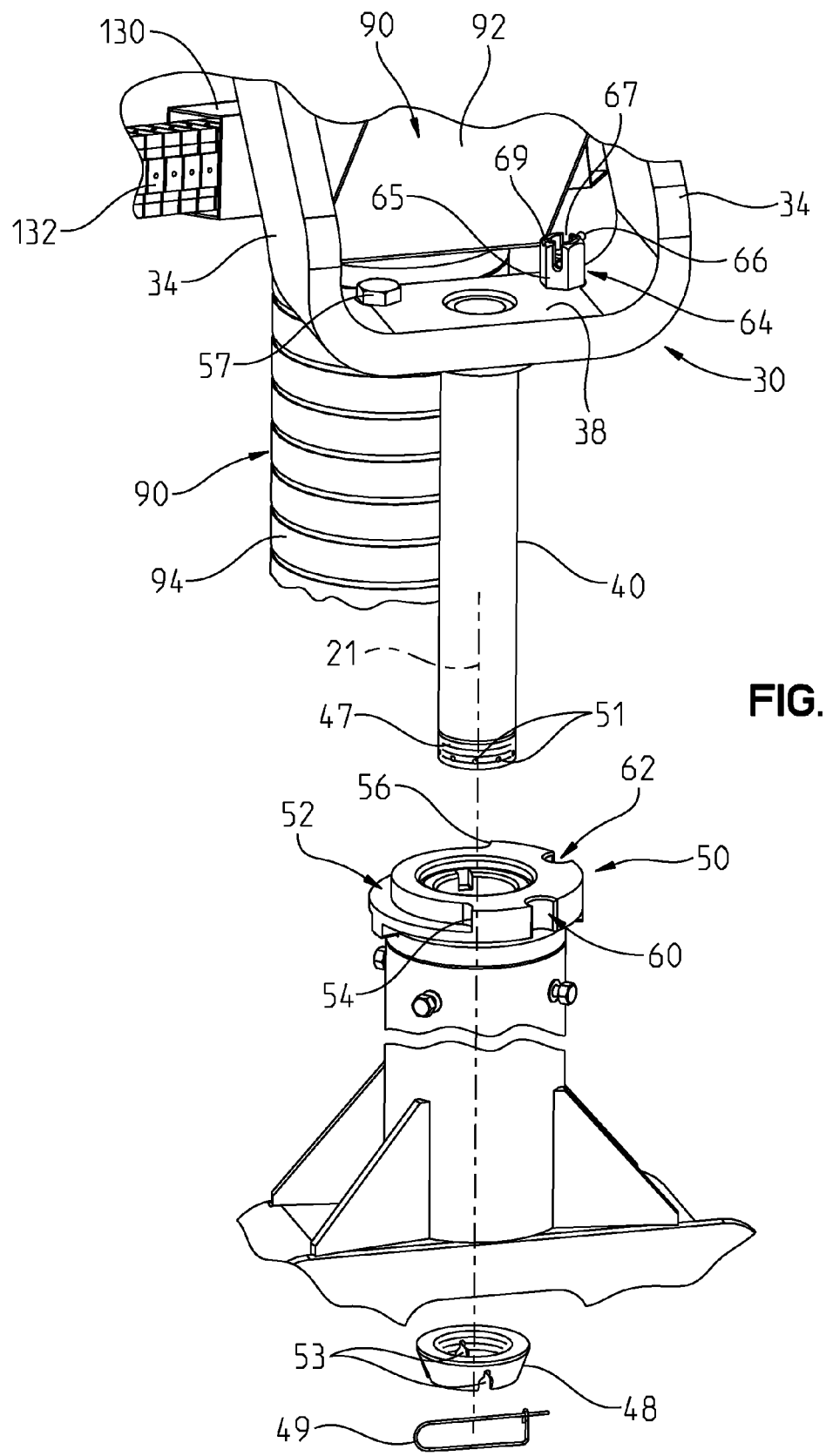
FIG. 12 is a partially exploded perspective view showing interaction between the carriage and the azimuth stop body.
Figure 13:
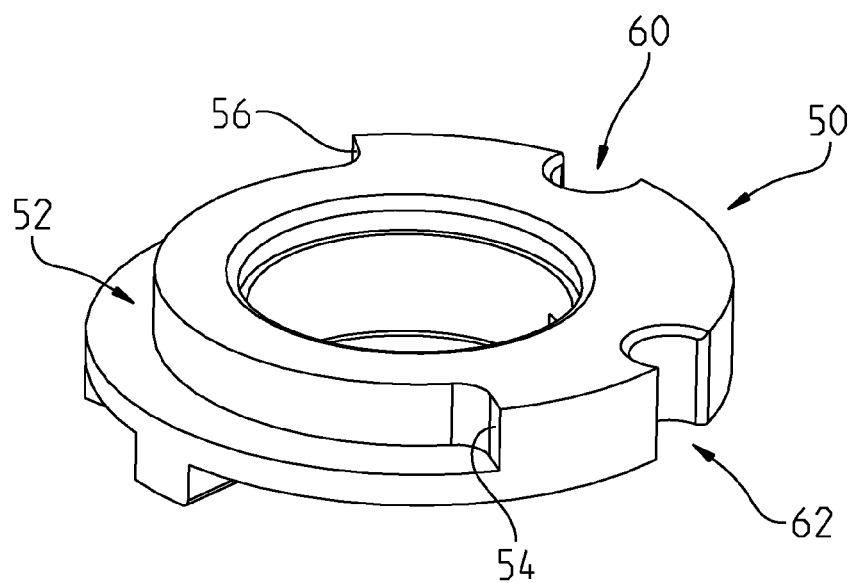
FIG. 13 is a top perspective view of the azimuth stop body of the cradle of the gun mount assembly of FIG. 12.
Figure 14:
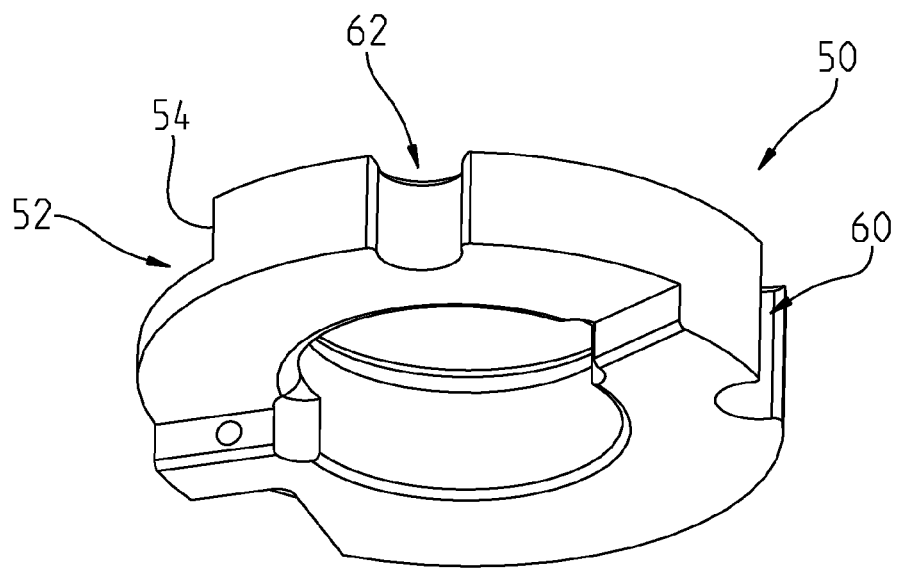
FIG. 14 is a bottom perspective view of the azimuth stop body of FIG. 13.

Referring now to FIG. 11, a first or upper end 43 of the pintle 40 is secured to the base 38 of the carriage 30 through fasteners 44, such as screws extending through a collar 45. A second or lower end 46 of the pintle 40 includes a nut 48 secured thereto and configured to secure the carriage 30 to the support assembly 14. More particularly, the nut 48 is threadably received on a threaded lower portion 47 of the pintle 40. A safety pin 49 prevents unintended loosening of the nut 48 by being received within slots 51 of nut 48 and passing through diametrically opposed openings 53 of pintle 40.

With reference to FIGS. 11-14, the pintle 40 permits rotational movement about axis 21 (i.e., azimuth) of the carriage 30. A pintle adapter or azimuth stop body 50 is supported by the mounting tube 42 and includes an arcuate raceway 52 extending between stops 54 and 56. A stud 57 including a pin 58 extends downwardly from the base 38 of the carriage 30 and is configured to ride within the raceway 52 as the carriage 30 is rotated about the longitudinal axis. The stops 54 and 56 define the rotational limits of travel for the carriage 30 about axis 21.

Figure 8:
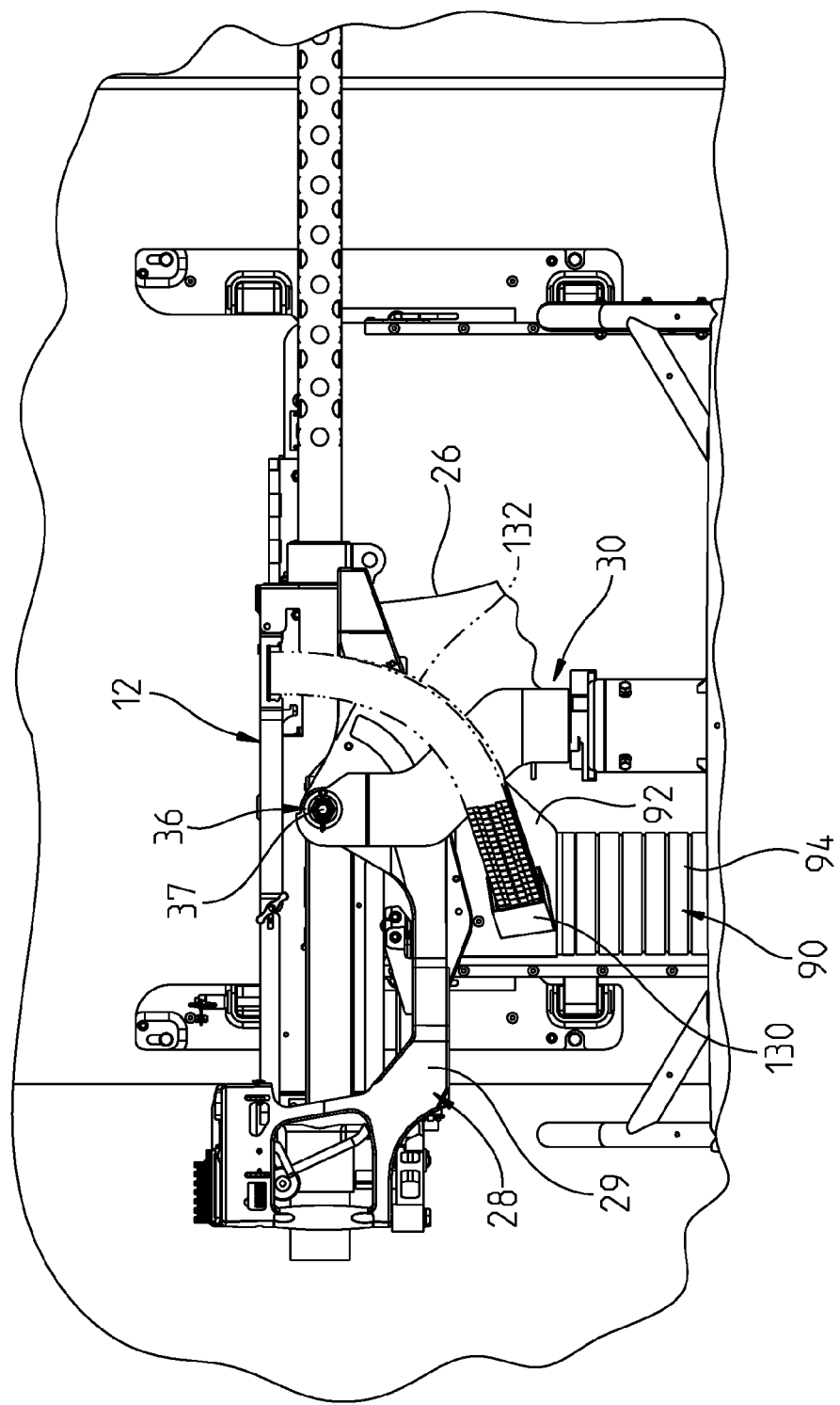
FIG. 8 is a side elevational view similar to FIG. 7, showing the carriage oriented in a forward position.
Figure 9:
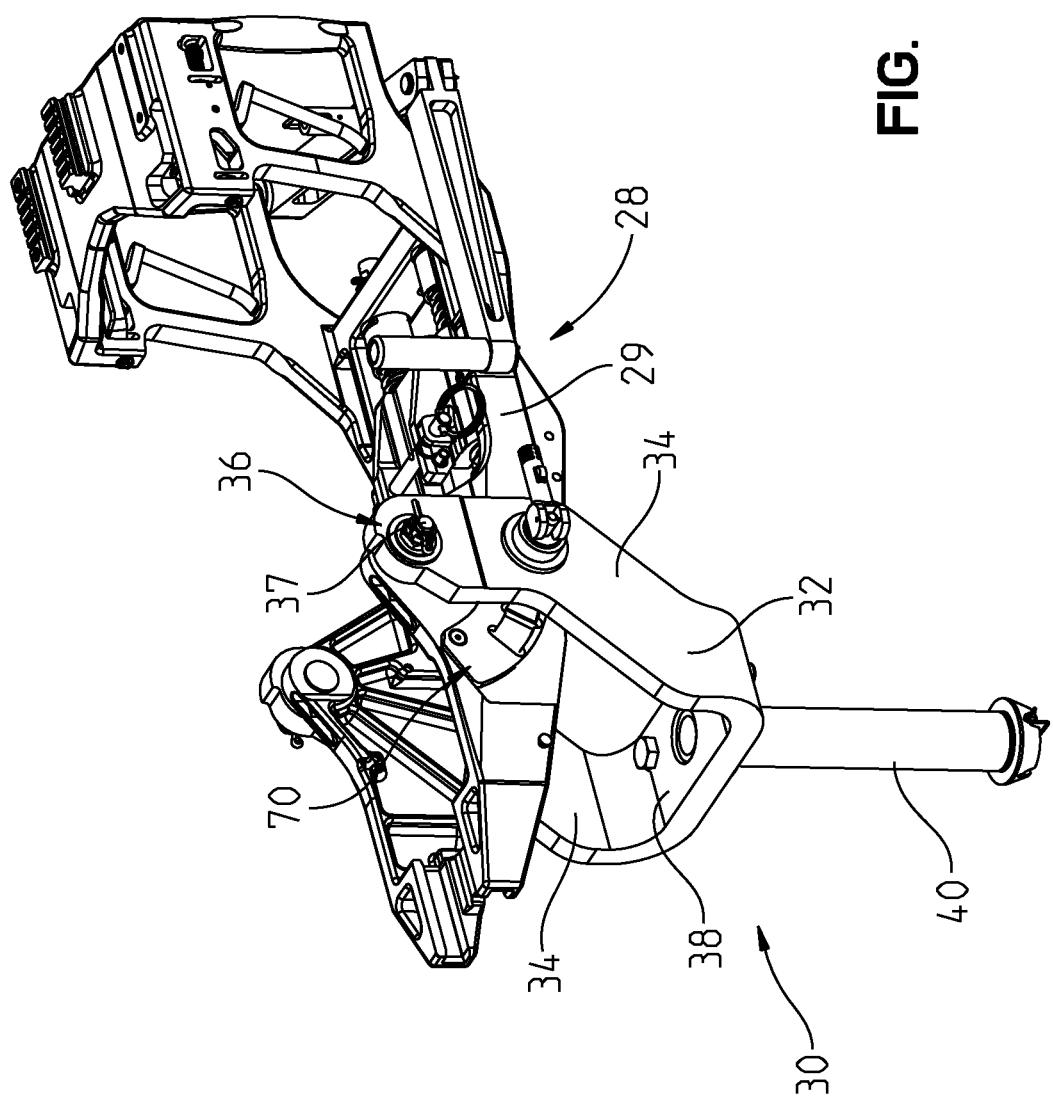
FIG. 9 is a top perspective view of the carriage and the cradle of the gun mount assembly of FIG. 6.
Figure 10:
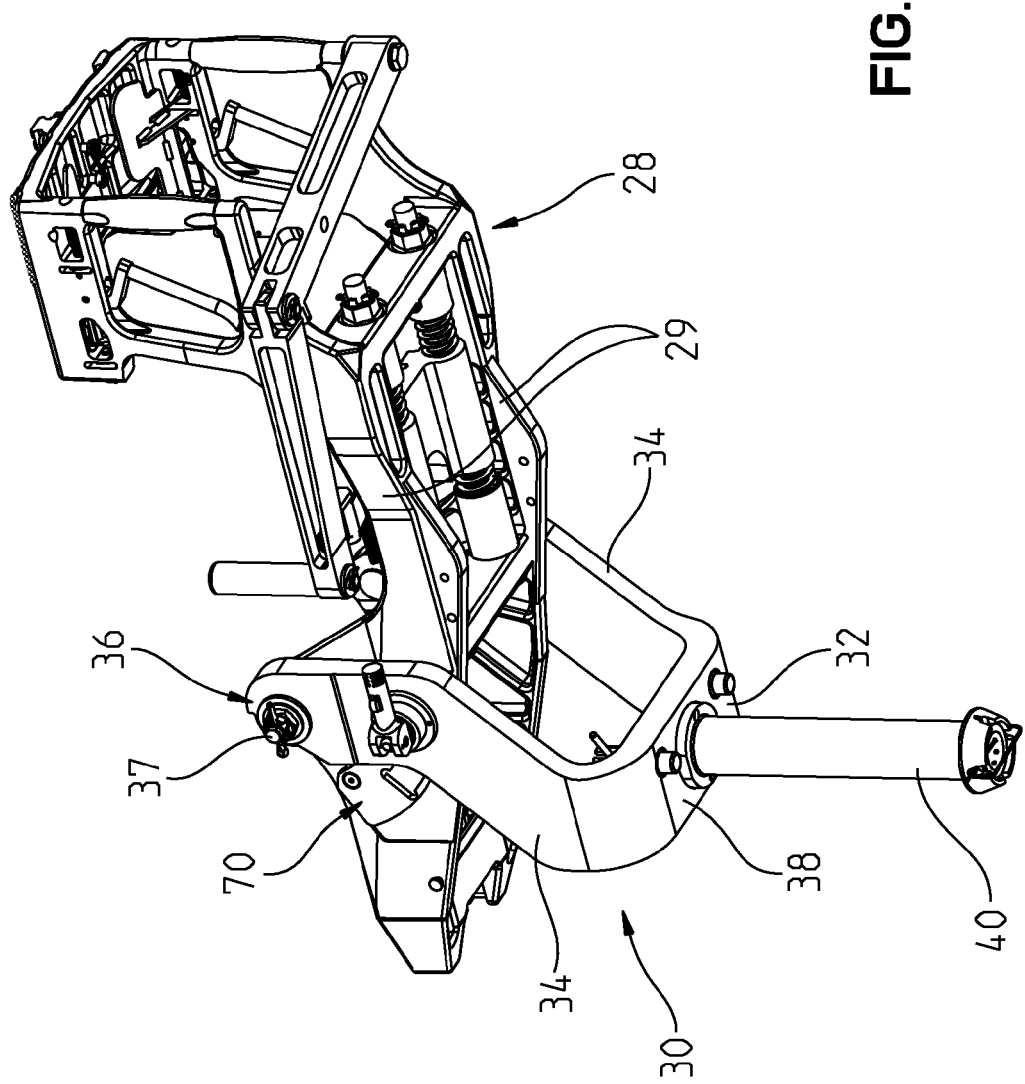
FIG. 10 is a bottom perspective view of the carriage and the cradle of the gun mount assembly of FIG. 9.

A pair of notches 60 and 62 are formed in the peripheral edge of the stop body 50 and are configured to alternately cooperate with a spring biased stow pin assembly 64 extending downwardly from the base 38 of the carriage 30. The stow pin assembly 64 illustratively includes a pin 63 slidably received within a receiver 65 and spring biased downwardly in a down position (FIG. 11). A handle 66 is coupled to an upper end of the pin 63 to permit a user to raise and lower the pin 63. The handle 66 is received within a first slot 67 when in a lowered position, and is received within a second slot 69 when in a raised position. When the pin 63 is lowered and received within notch 60 of the stop body 50, the carriage 30 supports the machine gun 12 in a position substantially perpendicular to the helicopter 16 (FIG. 2). When the pin 63 is lowered and received within notch 62 of the stop body 50, the carriage 30 supports the machine gun 12 in a stowed position substantially parallel to the helicopter 16 (FIG. 8).

Figure 15:
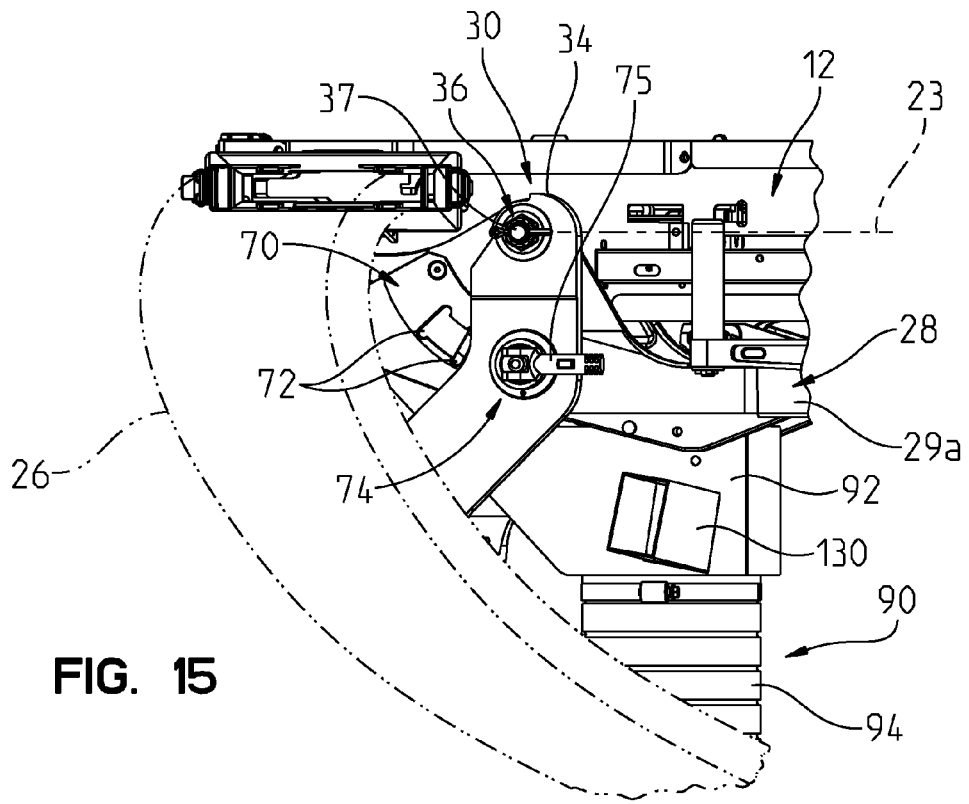
FIG. 15 is a side perspective view showing the elevation stop body and carriage in a first position.
Figure 16:
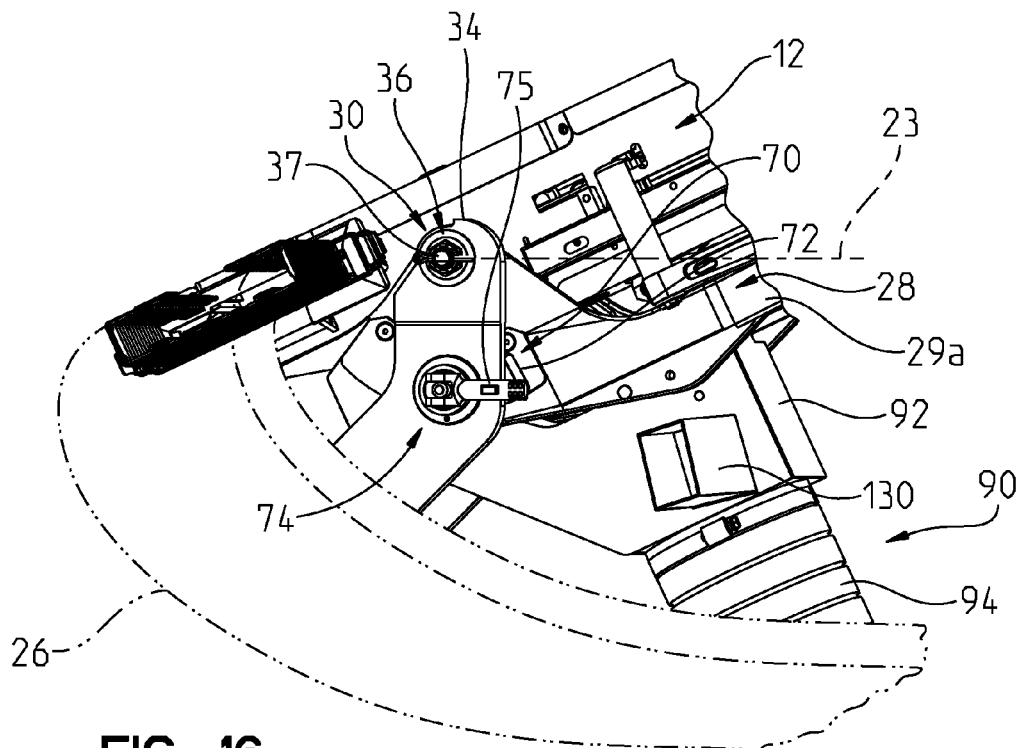
FIG. 16 is a side perspective view similar to FIG. 15, showing the elevation stop body and carriage in a second position.
Figure 17:
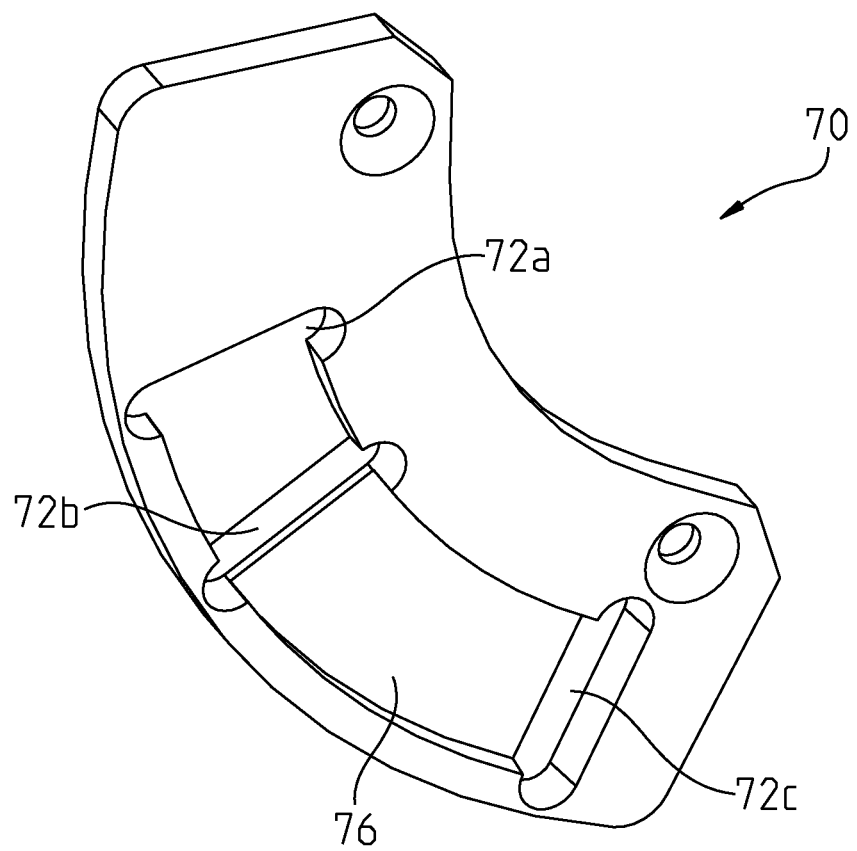
FIG. 17 is a perspective view of the elevation stop body of the gun mount assembly of FIG. 9.

With reference to FIGS. 15-17, a cradle elevation stop member 70 is secured to side member 29a of the cradle 28 and is configured to provide discrete set points, as defined by depressions or recesses 72a, 72b, 72c for the elevation of the machine gun 12. As shown in FIGS. 15 and 16, a spring biased toggle pin 74 may be set and released, through operation of a lever handle 75, in position within one of the recesses 72a, 72b, 72c to provide a desired set point for the angular orientation of the cradle 28 and hence the machine gun 12 about transverse axis 23. In the illustrative embodiment, the recesses 72a, 72b, 72c are circumferentially spaced apart along an arcuate pathway 76.

Figure 18:
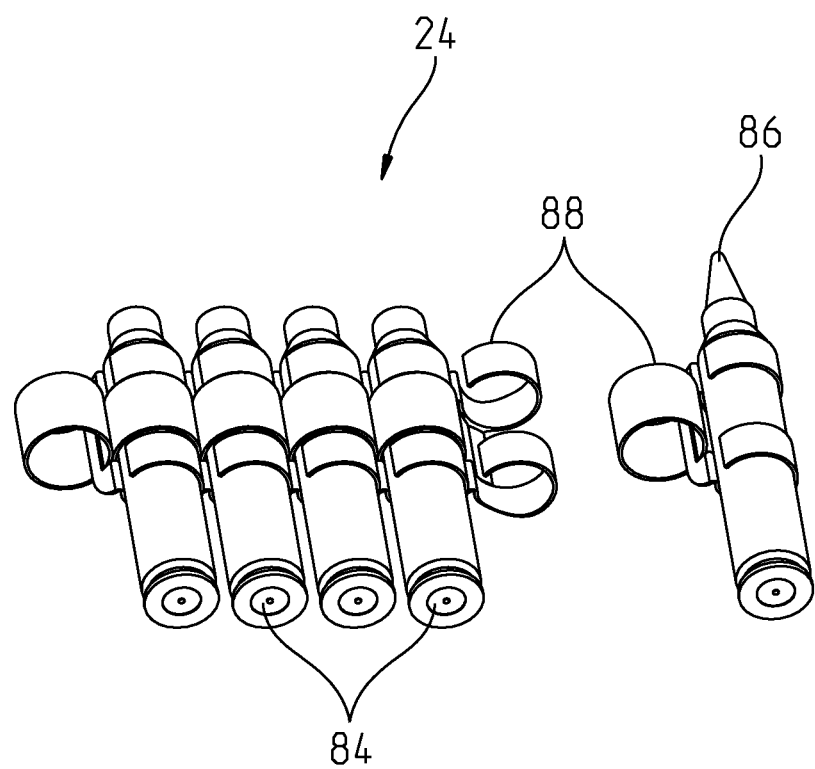
FIG. 18 is a perspective view of representative ammunition belt including casings and links.

The ammunition canister and mounting assembly 22 is operably coupled to the machine gun 12 and includes an ammunition receptacle or canister 82 configured to receive a predetermined number of rounds of ammunition. In one illustrative embodiment, the canister 82 is configured to receive 600 rounds of ammunition forming ammunition belt 24. The ammunition belt 24 is stored in a serpentine pattern within a storage compartment 81 of the canister 82 to facilitate feeding to the machine gun 12 through the feed chute 26. The ammunition belt 24 may be of conventional design as including a plurality of rounds including a casing 84 receiving a bullet 86, and a plurality of links 88 interconnecting adjacent casings 84 (FIG. 18). The casings 84 and links 88 are typically made of metal, such as brass.

As is known, when bullets 86 are fired from the machine gun 12, the spent casings 84 and associated links 88 are ejected at elevated temperatures. More particularly, spent casings 84 generally fall from the bottom of the machine gun 12 while links 88 are generally ejected from the side of the machine gun 12 opposite the feed chute 26. An ejection chute assembly 90 is provided to collect and distribute casings 84 and links 88 exiting from the machine gun 12 in order to reduce the likelihood of the casings 84 and links 88 from falling onto helicopter external stores, such as rockets 18, or within the operator compartment of the helicopter 16. More particularly, hot casings 84 and links 88 coming into contact with other stores on the helicopter 16 may adversely affect their operation and/or present safety concerns.

Figure 19:
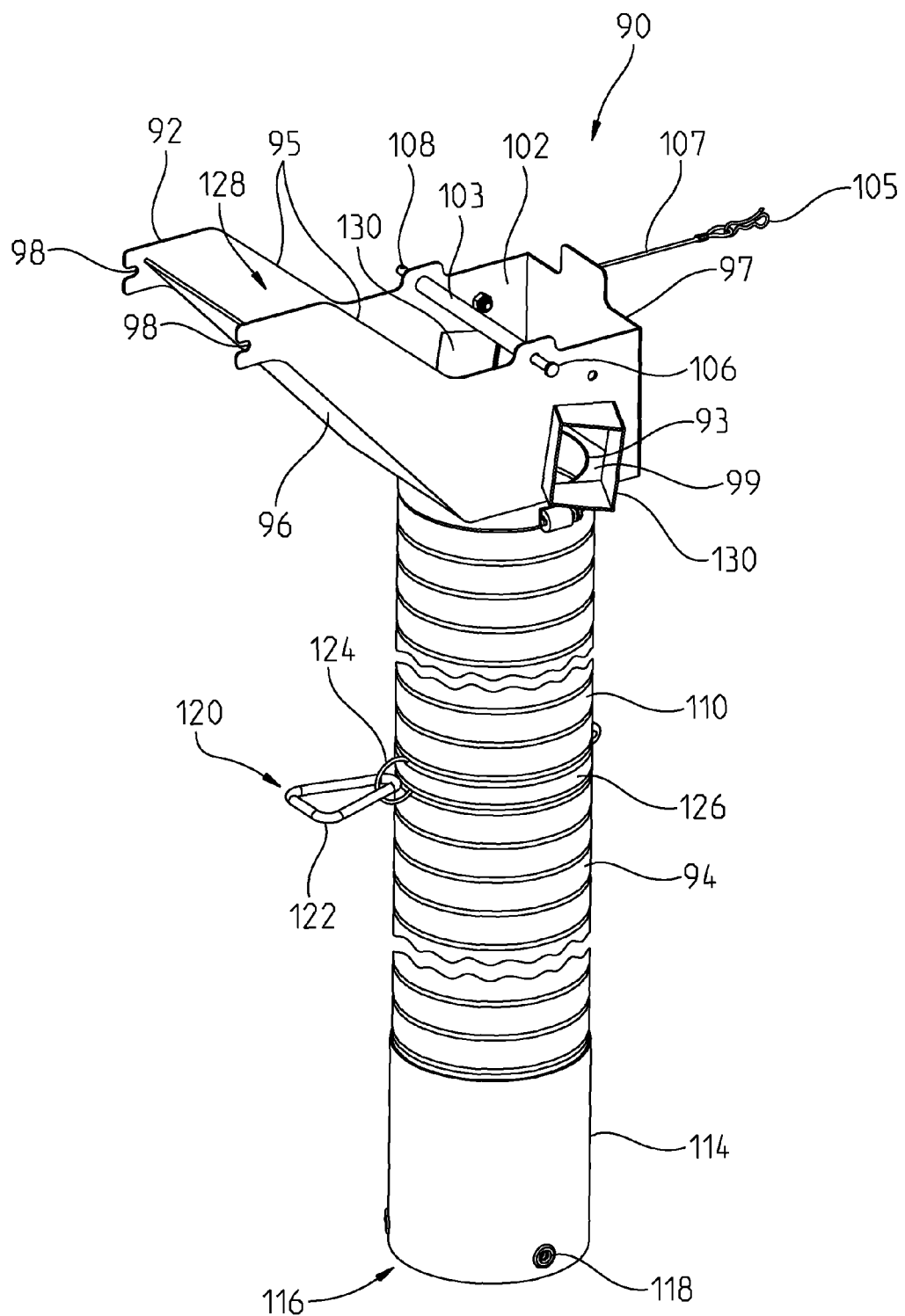
FIG. 19 is a perspective view of the ejection chute assembly of FIG. 5.
Figure 20:
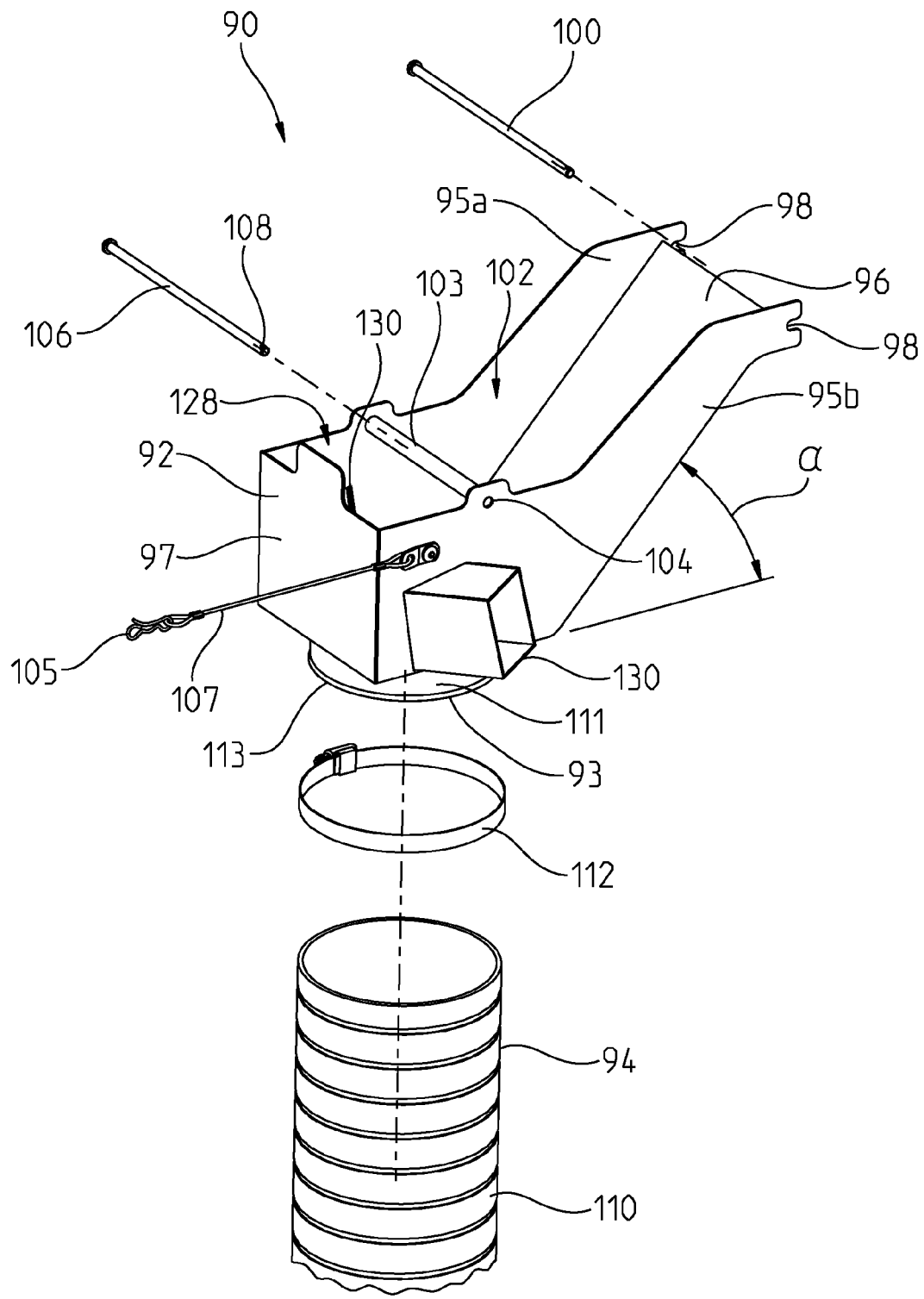
FIG. 20 is an exploded perspective view of the ejection chute assembly of FIG. 19.
Figure 21:
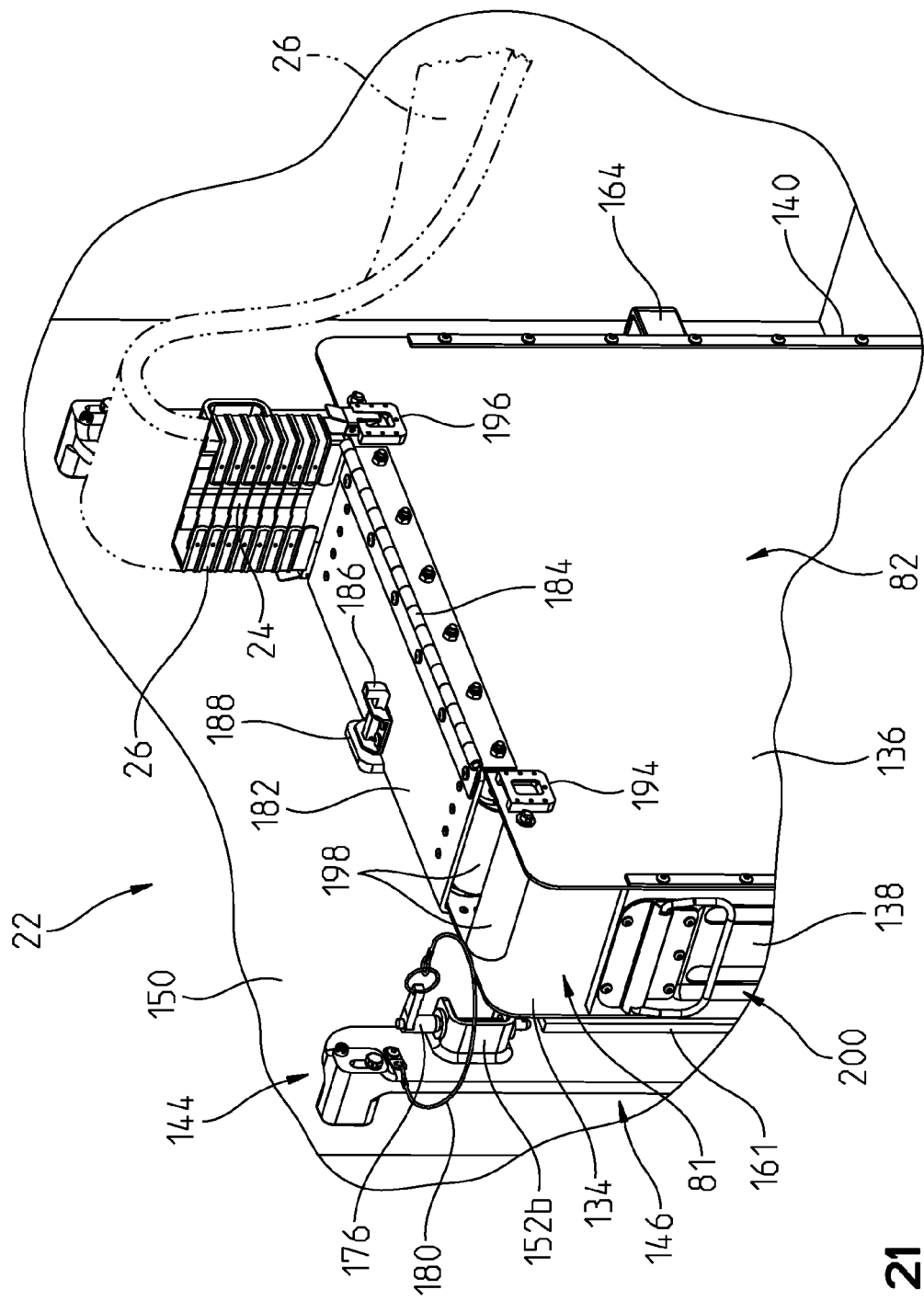
FIG. 21 is a perspective view of the ammunition canister and the feed chute for feeding the ammunition belt from an ammunition canister to the machine gun of FIG. 2.

With reference to FIGS. 2-4, 19 and 20, the ejection chute assembly 90 includes a hopper 92 including an outlet opening 93 (FIG. 19) coupled to a downwardly extending ejection tube 94. The hopper 92 is illustratively formed of a durable metal, such as stainless steel or aluminum, and is received intermediate the uprights 34 of the carriage 30 and is coupled to the cradle 28. Referring further to FIGS. 19 and 20, the front end of the hopper 92 includes an inclined deflector 96 extending between first and second side walls 95a and 95b, while an end wall 97 extends between the side walls 95a and 95b at a rear end of the hopper 92. A bottom portion 99 extends between the side walls 95a and 95b intermediate the deflector 96 and the end wall 97. The bottom portion 99 defines the outlet opening 93 for receiving spent casings 84 and links 88.

The front end of walls 95 include a pair of notches 98 configured to receive a pin 100 extending laterally proximate a front end of the cradle 28 between side members 29 (FIG. 3). A collector 102 of the hopper 92 is defined between the side walls 95a and 95b, the deflector 96, and the end wall 97. A spacer tube 103 extends between a pair of apertures 104 formed within the side walls 95a and 95b and provides additional rigidity to the hopper 92. The spacer tube 103 is configured to slidably receive a laterally extending pin 106 for securing the ejection chute assembly 90 to the cradle 28. A cotter pin 105 is illustratively secured to the hopper 92 through a lanyard 107 and is configured to be received within an aperture 108 formed within the end of pin 106 to secure the pin 106 within the spacer tube 103.

The ejection chute assembly 90 is configured to facilitate conveyance of spent casings 84 and links 88 away from the gun 12, particularly when used in connection with a gun having a high rates of fire (for example GAU-21 with potential of 1,100 shots per minute). The deflector 96 cooperates with the outlet opening 93 to facilitate discharge of the spent casings 84 and links 88 into the ejection tube 94. More particularly, the deflector 96 is angled relative to the gun 12 such that spent casings 84 deflect or ricochet off of the deflector 96, pass through the outlet opening 93, and into the ejection tube 94, without tending to collect or jam by bridging the opening 93. The angle of deflection of the spent casings 84 is determined by the angle of discharge of the casings 84 from the gun 12 and the angle of the deflector 96 relative to the gun 12. In the illustrative embodiment shown in FIG. 6, the deflector 96 is angled from the longitudinal axis 109 of the gun barrel by about 47 degrees (+/−5 degrees). As such, the angle α as shown in FIG. 20 is about 47 degrees (+/−5 degrees) and the angle between the bottom portion 99 and the deflector 96 is about 133 degrees (+/−5 degrees).

As shown in FIG. 19, the ejection tube 94 illustratively includes a flexible portion 110 having an upper end coupled to a cylindrical connector 111 of the hopper 92 through a band clamp 112. A bottom portion of the connector 111 has an enlarged, illustratively flared, portion 113 having an increased diameter to prevent the clamp 112, and hence the tube 94, from slipping off of the hopper 92. An end sleeve 114 defines a lower open end 116 of the ejection tube 94 and is coupled to the flexible portion 110 through fasteners, such as grommets 118. The flexible portion 110 is illustratively formed of a heat and flame resistant material. In one illustrative embodiment, the flexible portion 110 is formed of CEET ducting, including a support formed of a copper coated or bronze plated spring steel wire helix, a liner and a cover formed of woven fiberglass fabric impregnated and coated with neoprene rubber, and a fiberglass cord impregnated with neoprene rubber supported outside of the cover. The end sleeve 114 may comprise a heat shrinkable insulation sleeving that is configured to prevent damaging contact with the lower end of the flexible portion 110 and fraying thereof.

A securing device 120 illustratively secures the ejection tube 94 to the support 18. The securing device 120 may comprise a releasable clip 122 coupled to a ring 124 which, in turn, is secured to the flexible portion 110 of the ejection tube 94 by a band clamp 126. The clip 122 coupled to one of the sway members 19 of the support 18 to restrict movement of the ejection tube 94 (FIG. 2).

An upper opening 128 of the hopper 92 collects the ejected casings 84 and directs them to the tube 94. Similarly, first and second ports or receivers 130 are supported by opposing side walls 95 of the hopper 92 and collect the ejected links 88 and direct them to the tube 94. As noted above, the links 88 are generally ejected from the side of machine gun 12 opposite the feed chute 26. As such, a link chute 132 is coupled to the receiver 130 opposite the feed chute 26 (FIG. 2). The opposing receivers 130 provides flexibility for coupling link chute 132 to opposing sides of the machine gun 12 depending upon the orientation thereof (for example, left or right side of the helicopter 16). In other words, the link chute 132 may be positioned on either side of the machine gun 12, opposite the feed chute 26. The link chute 132 is illustratively formed of interconnected stainless steel segments to provide flexibility and may be manufactured by Standard Armament of Glendale, Calif.

In operation, ejected casings 84 drop through the upper opening 128 of the hopper 92, while links 88 pass through the link chute 132 and through the receiver 130 of the hopper 92. The casings 84 and links 88 pass through the collector 102 and down through the ejection tube 94. The ejection tube 94 directs the ejected casings 84 and links 88 away from the helicopter 16. Combining the casings 84 and links 88 in the hopper 92 reduces space requirements and reduces operational issues with the machine gun 12. More particularly, the ejection chute assembly 90 facilitates ejection of casings 84 and links 88 associate with weapons operating at high rates of speed (for example, at the GAU-21 machine gun).

Figure 22:
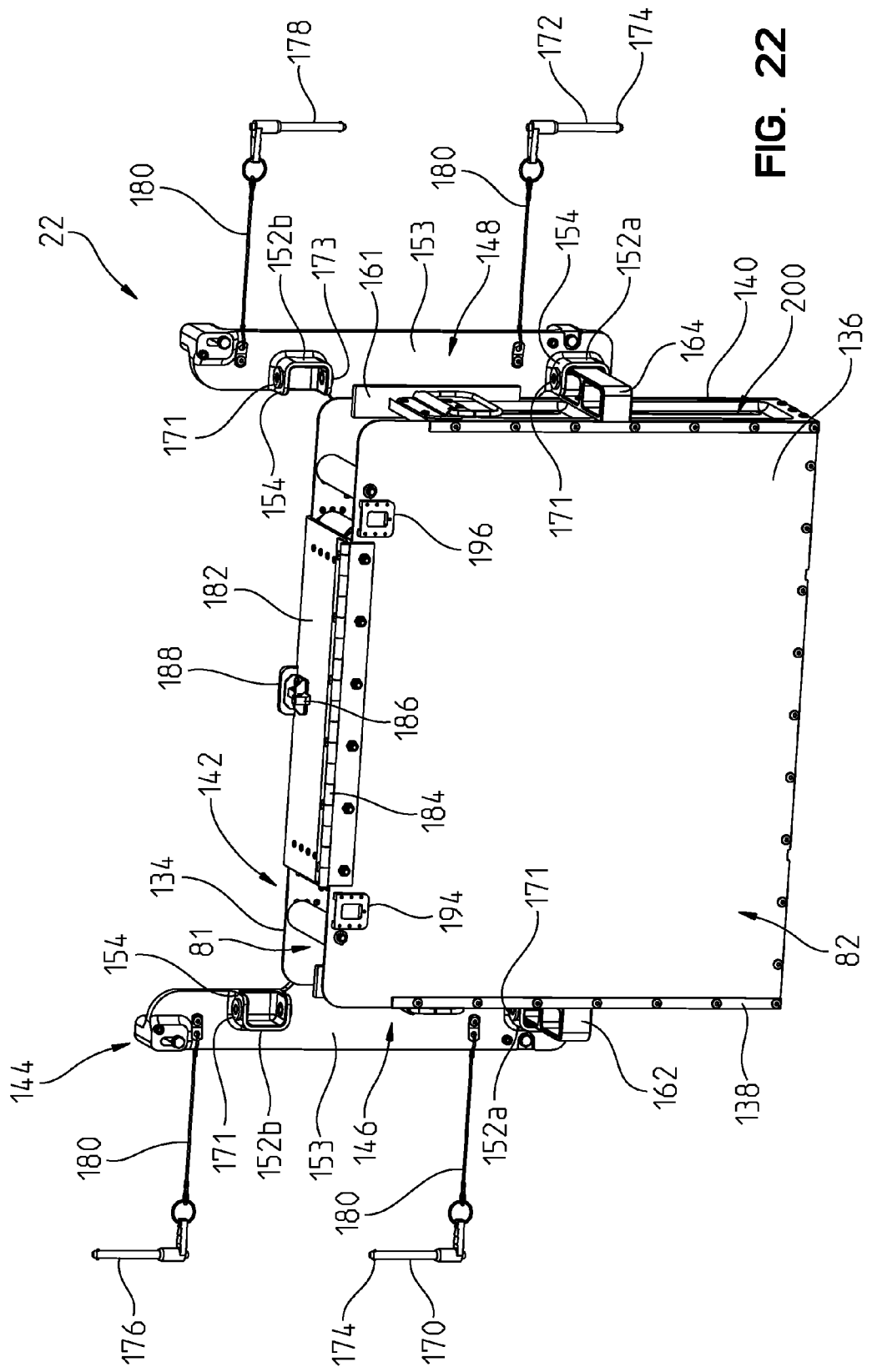
FIG. 22 is a partially exploded perspective view of the ammunition canister and mounting assembly of the aircraft armament system of FIG. 5.
Figure 23:
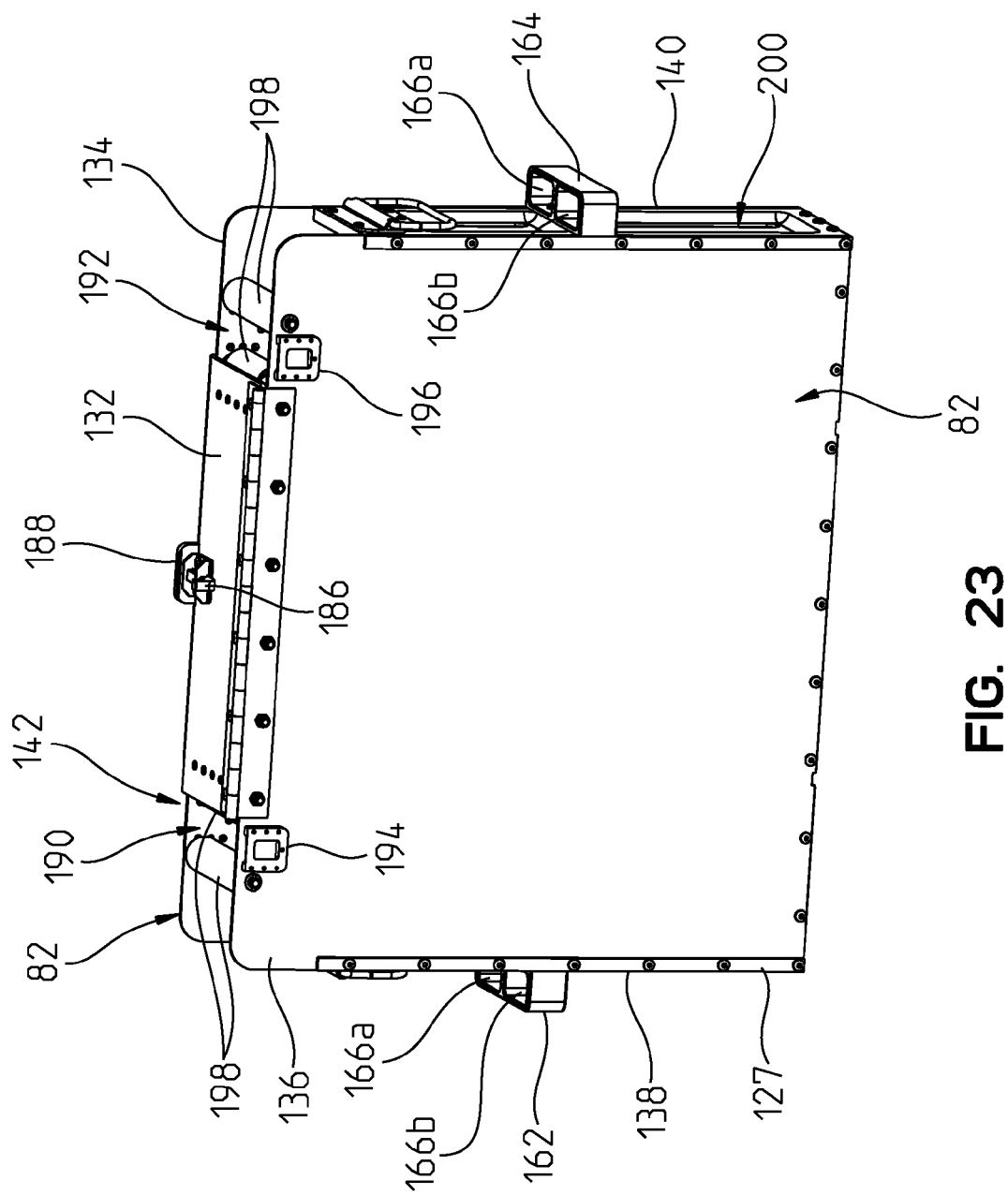
FIG. 23 is a perspective view of the ammunition canister of FIG. 22.

With reference to FIGS. 2-5 and 21, the ammunition canister 82 is configured to be releasably coupled to the interior of the helicopter 16 through a mounting assembly 144. As shown in FIGS. 22 and 23, the canister 82 illustratively includes a first side wall 134, and a second side wall 136 extending parallel to the first side wall 134. A first end wall 138 extends between the first side wall 134 and the second side wall 136. A second end wall 140 extends between the first side wall 134 and the second side wall 136 in spaced relation to the first end wall 138. The storage compartment 81 is defined by the walls 134, 136, 138, and 140 and is accessible through an open upper end 142.

Referring now to FIGS. 22, 24, and 25, the mounting assembly 144 includes a pair of first mounting members, illustratively a first or left receiver 146 and a second or right receiver 148 supported by a vertical mounting surface 150. The mounting surface 150 may comprise the longitudinally extending transmission wall of the helicopter 16. The receivers 146 and 148 each illustratively include a first or lower coupler 152a and a second or upper coupler 152b supported by a base 153 secured to mounting surface 150. With reference to FIGS. 24 and 25, each coupler 152a and 152b illustratively includes a C-shaped bracket 154 having an upper arm 156 and a lower arm 158 defining an end bracket receiving opening 160. A resilient pad 161, illustratively a polyurethane foam, may be supported by the base 153 and provides a cushion between the canister 82 and the mounting surface 150.

Referring further to FIGS. 22 and 23, a pair of second mounting members, illustratively a first or left end bracket 162 and a second or right end bracket 164 are secured to opposing first and second end walls 138 and 140, respectively, of the canister 82. Each bracket 162, 164 includes laterally spaced apart openings 166a and 166b (FIG. 23). The first end bracket 162 is configured to be releasably coupled to the first receiver 146, and the second end bracket 164 is configured to be releasably coupled to the second receiver 148. More particularly, a first pin 170 is illustratively slidably received by the first end bracket 162 and the lower coupler 152a of first receiver 146, while a second pin 172 is illustratively slidably received by the second end bracket 164 and the lower coupler 152a of the second receiver 148.

As shown in FIG. 22, the arms 156 and 158 of the brackets 154 each include upper and lower bushings 171 and 173, respectively, configured to slidably receive one of the pins 170 and 172. Each pin includes a spring biased ball 174 configured to engage respective bushing 171, 173 as the pin 170, 172 is moved axially therethrough.

A third pin 176 is illustratively slidably received by the upper coupler 152b of the first receiver 146, while a fourth pin 178 is illustratively slidably received by the upper coupler 152b of the second receiver 148. The pins 170, 172, 176, 178 are secured to the respective bases 153 by lanyards 180.

The combination of lower coupler 152a and upper coupler 152b for each receiver 146 and 148 facilitates mounting of different size ammunition canisters to the mounting surface 120. In the illustrative embodiment, the receiver 146 and 148 may be utilized to mount either GAU-21 or GAU-17 ammunition canisters. The upper couplers 152b provide additional flexibility in mounting canisters 82 of varying sizes (for example, to accommodate different types, sizes, and amounts of ammunition). For example, canister 82 of FIG. 22 includes only single brackets 162 and 164 on each end wall 138 and 140, while larger canisters 82 may be taller and have a second set of brackets (not shown) above the brackets 162 and 164 for coupling with couplers 152b.

The left and right end brackets 162 and 164 are mirror images of each other to facilitate mounting of the canister 82 on either side of the helicopter 16. In other words, the canister may be coupled with the first side wall 134 facing the mounting surface 150 in a first orientation, and may be coupled with the second side wall 134 facing the mounting surface 150 in a second orientation (i.e., rotated 180 degrees about a vertical axis).

Figure 26:
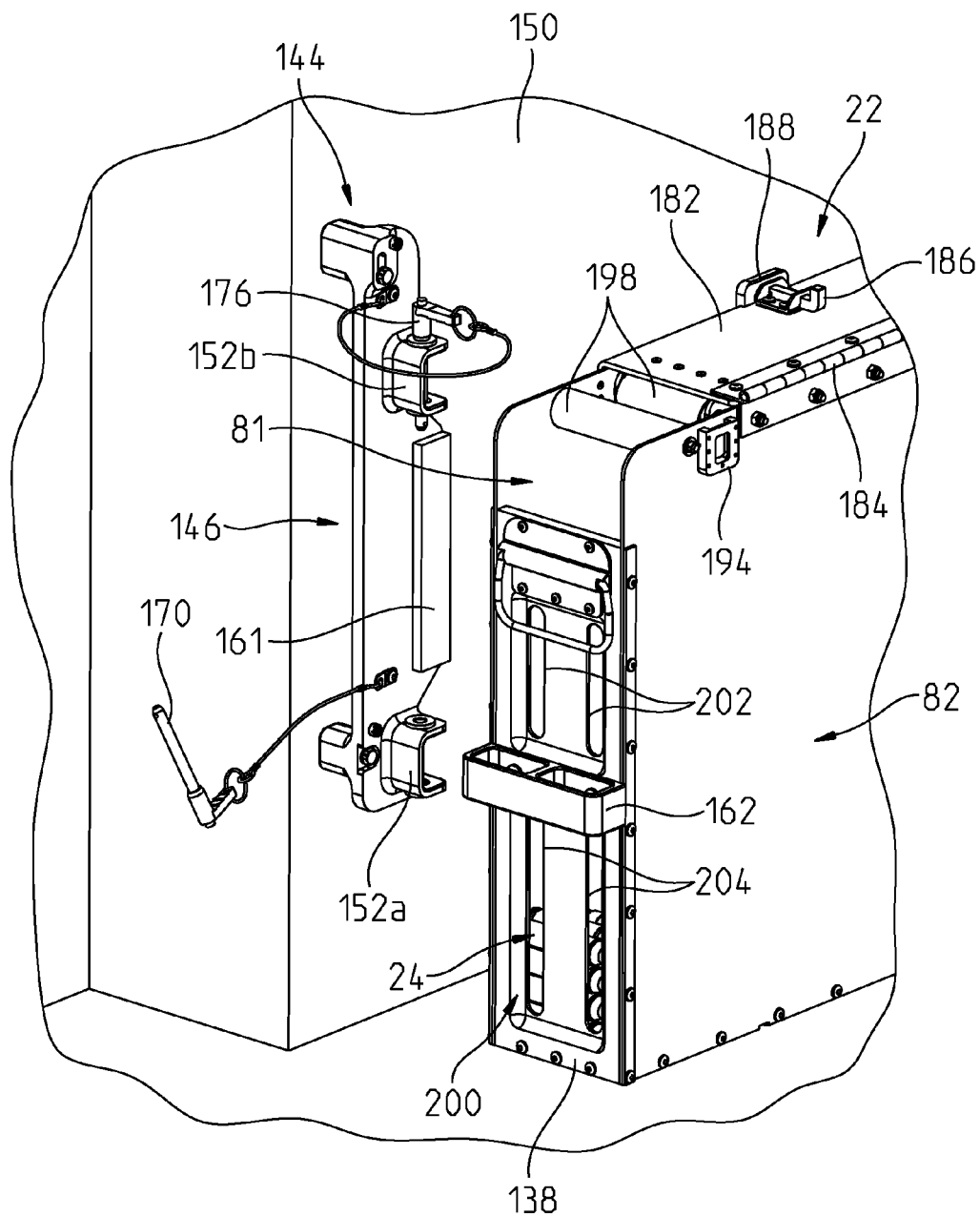
FIG. 26 is a left side perspective view of the ammunition canister and mounting assembly of FIG. 22, with the canister uncoupled from the receiver.
Figure 27:
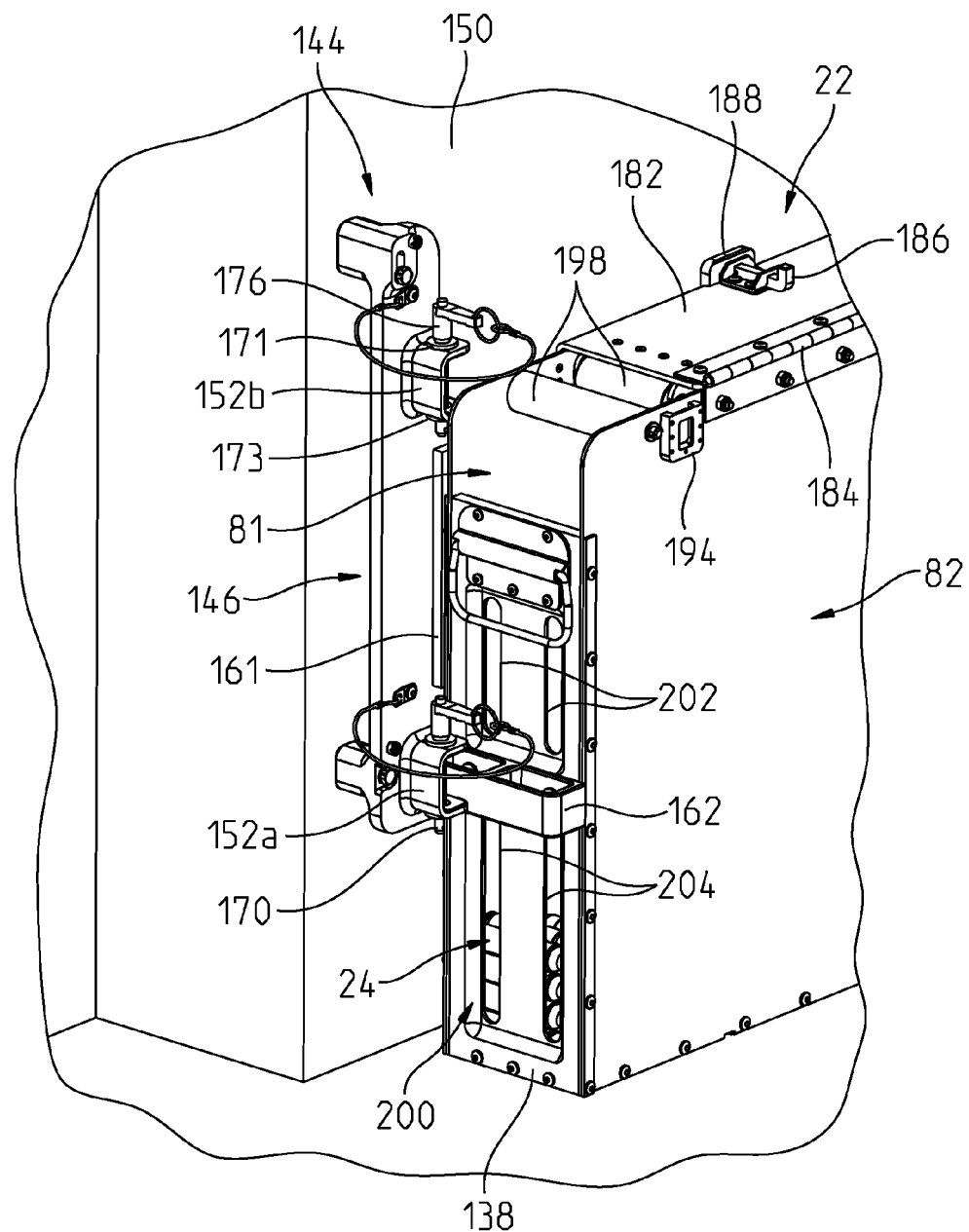
FIG. 27 is a left side perspective view similar to FIG. 26, showing the canister coupled to the receiver.
Figure 28:
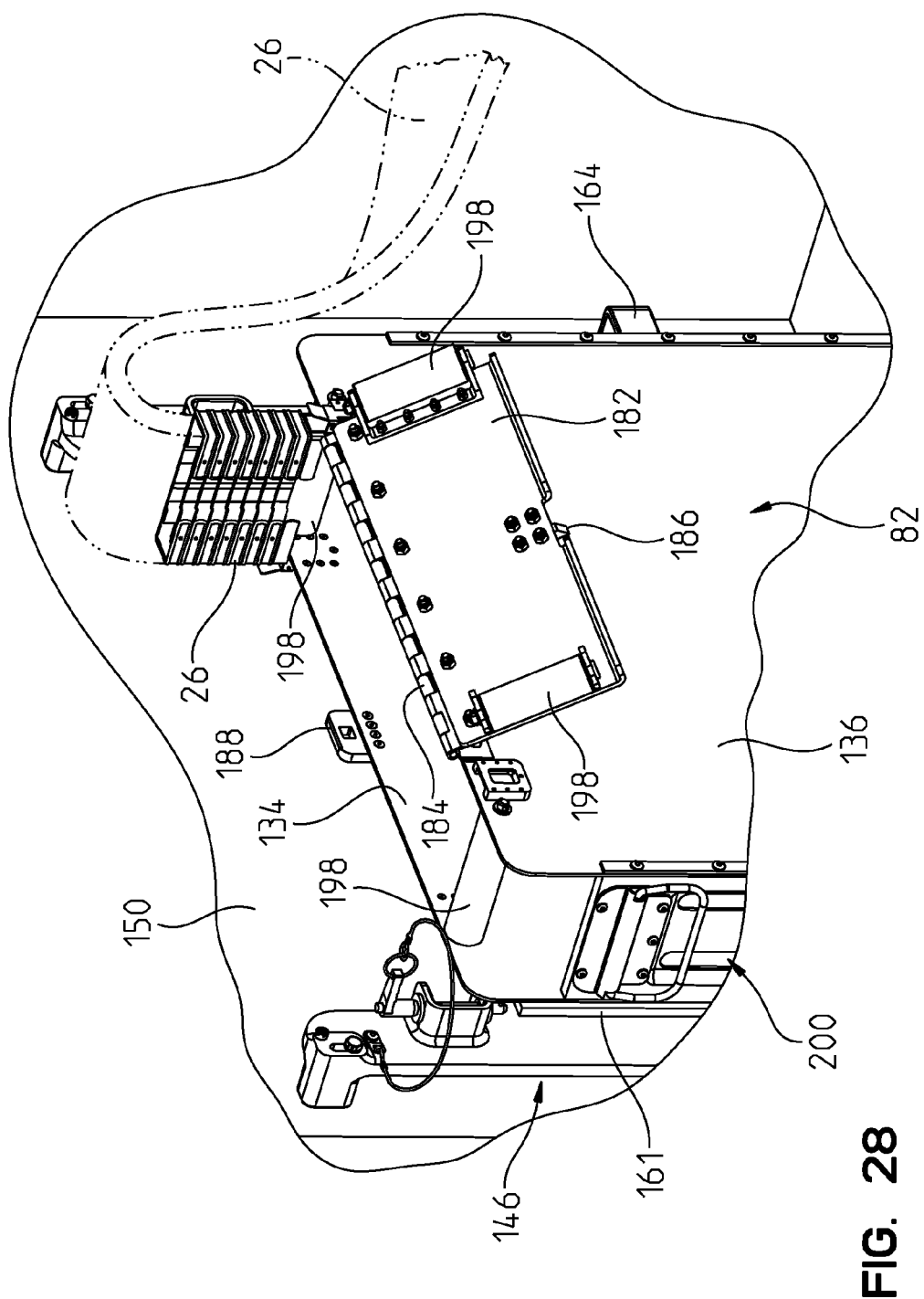
FIG. 28 is a top perspective view of the ammunition canister of FIG. 22, showing the hinged lid in an open position.

With reference to FIGS. 26-28, the ammunition canister 82 also includes a lid 182 coupled to second side wall 136 by a hinge 184 to cover at least a portion of open upper end 142. A latch 186 is supported opposite the hinge 184 and is configured to engage a catch 188 supported by the first side wall 134.

As shown in FIG. 22, a first outlet opening 190 is defined between the lid 182 and the first end wall 138, while a second outlet opening 192 is defined between the lid 182 and the second end wall 140. The ammunition feed chute 26 may be operably coupled to the canister 82 above the first outlet opening 190 in the first orientation of the canister 82 (FIG. 21), and may be operably coupled to the canister 82 above the second outlet opening 192 in the second orientation of the canister 82. A first pair of feed chute catches 194 are supported by the first and second side walls 134 and 136 adjacent the first outlet opening 190, and a second pair of feed chute catches 196 are supported by the first and second side walls 134 and 136 adjacent the second outlet opening 192. Rollers 198 are provided on opposing sides of the lid 182 to facilitate feeding of the ammunition belt 24 from the canister 82 through the feed chute 26.

The ammunition feed chute 26 extends from the outlet opening 190,192 of the ammunition canister 82 to a receiver chamber 199 of the gun 12. The canister 82 is mounted adjacent the vertical mounting surface 150 and the floor 151 to minimize the consumption of usable space within the enclosure 13, and to ensure sufficient positioning of the feed chute 26 so it limits restrictions on movement of the ammunition belt 24 through the feed chute 26 over the full range of movement of the gun 12. The outlet opening 190, 192 of the ammunition canister 82 is illustratively positioned below the receiver chamber 199 of the gun 12 to reduce the bending of the feed chute 26 therebetween and limit the drag on the ammunition belt 24 traveling through the feed chute 26.

With reference to FIGS. 26 and 27, end walls 138 and 140 of the canister 82 include sights 200 such that ammunition belt 24 remaining in the storage compartment 81 of canister 82 is visible. As such, the operator can view how much ammunition is remaining or needs to be added. Illustratively, the sight 200 comprises a pair of upper vertical slots 202 formed in the first and second end walls 138 and 140 above the respective end brackets 162 and 164, and a pair of lower vertical slots 204 formed in the first and second end walls 138 and 140 below the respective end brackets 162 and 164.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An aircraft comprising:
   an enclosure including a vertical mounting surface and a horizontal floor;
   a structure coupled to the enclosure in spaced relation to the vertical mounting surface;
   a gun including a receiver chamber and supported by the structure for a first rotation about a first axis, and for a second rotation about a second axis, the second axis perpendicular to the first axis;
   an ammunition canister including an outlet opening and coupled to the vertical mounting surface adjacent the horizontal floor;
   a feed chute configured to convey an ammunition belt from the outlet opening of the ammunition canister to the receiver chamber of the gun;
   wherein the outlet opening of the ammunition canister is positioned below the receiver chamber of the gun to reduce the bending of the feed chute therebetween and limit the drag on the ammunition belt traveling through the feed chute;
   a first end bracket secured to a first end of the canister;
   a second end bracket secured to a second end of the canister;
   a first end receiver configured to be secured to the vertical mounting surface and to receive the first end bracket;
   a second end receiver configured to be secured to the vertical mounting surface and to receive the second end bracket;
   a first pin configured to be slidably received by the first end bracket and the first end receiver for releasably coupling the first end bracket to the first end receiver; and
   a second right pin configured to be slidably received by the second end bracket and the second end receiver for releasably coupling the second end bracket to the second end receiver;
   a lid to at least partially cover an open upper end;
   wherein a first outlet opening is defined between the lid and the first end wall, and a second outlet opening is defined between the lid and the second end wall;
   wherein the feed chute extends above the first opening in a first orientation of the canister and extends above the second opening in a second orientation of the canister, the second orientation being rotated 180 degrees about a vertical axis.

* * * * *